United States Patent
Landers, Jr. et al.

(10) Patent No.: US 10,380,816 B2
(45) Date of Patent: *Aug. 13, 2019

(54) ACCESSING A SECURE REGION OF AN ENVIRONMENT USING VISUALLY IDENTIFIED BEHAVIORS RELATIVE TO AN ACCESS CONTROL DEVICE

(71) Applicant: Toshiba Global Commerce Solutions Holdings Corporation, Tokyo (JP)

(72) Inventors: John David Landers, Jr., Raleigh, NC (US); Dean Frederick Herring, Youngsville, NC (US); Paul Morton Wilson, Cary, NC (US); David John Steiner, Raleigh, NC (US); Kimberly Ann Wood, Raleigh, NC (US)

(73) Assignee: Toshiba Global Commerce Solutions Holdings Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/042,664

(22) Filed: Jul. 23, 2018

(65) Prior Publication Data
US 2018/0350174 A1 Dec. 6, 2018

Related U.S. Application Data

(63) Continuation of application No. 15/415,309, filed on Jan. 25, 2017, now Pat. No. 10,032,326.

(51) Int. Cl.
*G07C 9/00* (2006.01)
*G06K 9/00* (2006.01)
*G06K 9/62* (2006.01)

(52) U.S. Cl.
CPC ..... *G07C 9/00158* (2013.01); *G06K 9/00228* (2013.01); *G06K 9/00335* (2013.01);
(Continued)

(58) Field of Classification Search
CPC .......... G07C 9/00158; G06K 9/00335; G06K 9/6267
(Continued)

(56) References Cited

U.S. PATENT DOCUMENTS 6,707,381 B1    3/2004  Maloney
7,006,982 B2    2/2006  Sorensen
(Continued)

OTHER PUBLICATIONS

Popa et al., "Analysis of Shopping Behavior based on Surveillance System", Proceedings of the IEEE International Conference on Systesm, Man and Cybernetics, Istanbul, Turkey, Oct. 10-13, 2010, pp. 2512-2519.
(Continued)

*Primary Examiner* — Ojiako K Nwugo
(74) *Attorney, Agent, or Firm* — Patterson + Sheridan, LLP

(57) ABSTRACT

A method, computer program product, and system are disclosed for facilitating access by a first person to a secure region that is at least partly defined by an access control device. The method acquires, using at least one visual sensor, first image information including the first person and the access control device. The method identifies the first person using image analysis performed on the first image information. The method further identifies a first behavior of the first person relative to the access control device. Upon determining the first behavior corresponds to a predefined visual access behavior indicating that the first person is in the process of manually operating the access control device, and that the security level of the first person satisfies a predetermined threshold security level associated with the access control device, the method permits the first person to physically access the secure region.

17 Claims, 14 Drawing Sheets

(52) U.S. Cl.
CPC ....... *G06K 9/00771* (2013.01); *G06K 9/6267* (2013.01); *G07C 9/00166* (2013.01); *G06K 9/00295* (2013.01)

(58) Field of Classification Search
USPC .................................................. 340/5.1–5.7
See application file for complete search history.

(56) References Cited

U.S. PATENT DOCUMENTS

| | | | |
|---|---|---|---|
| 7,319,479 | B1 | 1/2008 | Crabtree et al. |
| 7,930,204 | B1 | 4/2011 | Sharma et al. |
| 8,009,863 | B1 | 8/2011 | Sharma et al. |
| 8,036,946 | B2 | 10/2011 | Angell et al. |
| 8,189,926 | B2 | 5/2012 | Sharma et al. |
| 8,219,438 | B1 | 7/2012 | Moon et al. |
| 8,325,982 | B1 | 12/2012 | Moon et al. |
| 8,380,558 | B1 | 2/2013 | Sharma et al. |
| 8,502,869 | B1 | 8/2013 | Fuhr et al. |
| 8,941,467 | B2 | 1/2015 | Jankowski et al. |
| 9,031,961 | B1* | 5/2015 | Cabanero .......... G06F 17/30386 707/751 |
| 9,171,415 | B2 | 10/2015 | Adams et al. |
| 9,196,136 | B2 | 11/2015 | King |
| 10,032,326 | B1 | 7/2018 | Landers, Jr. et al. |
| 2005/0015592 | A1* | 1/2005 | Lin ..................... G06F 21/6218 713/166 |
| 2006/0149628 | A1 | 7/2006 | Chefalas et al. |
| 2008/0198006 | A1* | 8/2008 | Chou ................ G07C 9/00158 340/540 |
| 2010/0138037 | A1 | 6/2010 | Adelberg et al. |
| 2011/0265113 | A1* | 10/2011 | Apfel ..................... H04N 7/025 725/32 |
| 2012/0053725 | A1 | 3/2012 | Niederhuefner et al. |
| 2012/0182172 | A1 | 7/2012 | Sorensen |
| 2012/0281885 | A1* | 11/2012 | Syrdal .................... G10L 17/24 382/116 |
| 2012/0320199 | A1 | 12/2012 | Kundu et al. |
| 2013/0044914 | A1 | 2/2013 | Rai et al. |
| 2013/0284806 | A1 | 10/2013 | Margalit |
| 2013/0332271 | A1 | 12/2013 | Hay |
| 2014/0132728 | A1 | 5/2014 | Verano et al. |
| 2015/0029339 | A1 | 1/2015 | Kobres et al. |
| 2015/0039458 | A1 | 2/2015 | Reid |
| 2015/0188925 | A1* | 7/2015 | Gupta ................... H04L 63/101 726/4 |
| 2016/0078699 | A1* | 3/2016 | Kalb .................. G07C 9/00571 340/5.6 |
| 2016/0127378 | A1* | 5/2016 | Gupta ................... H04L 63/101 726/4 |
| 2016/0308859 | A1* | 10/2016 | Barry ................. H04L 63/0861 |
| 2017/0099200 | A1* | 4/2017 | Ellenbogen ............ H04L 43/04 |
| 2017/0177845 | A1* | 6/2017 | Botti ..................... G06F 21/316 |
| 2017/0308942 | A1 | 10/2017 | Landers, Jr. et al. |

OTHER PUBLICATIONS

Lwin, et al: "Automatic Door Access system Using Face Recognition", International Journal of Scientific & Technology Research, Jun. 30, 2015, pp. 294-299.

Trinh, et al: "Detecting Human Activities in Retail Surveillance using Hierarchical Finite State Machine", Acoustics Speech and Signal Processing, May 22, 2011.

Deng, et al.: "Face Recognition Lock", Department of CSIE, Dec. 31, 2013.

* cited by examiner

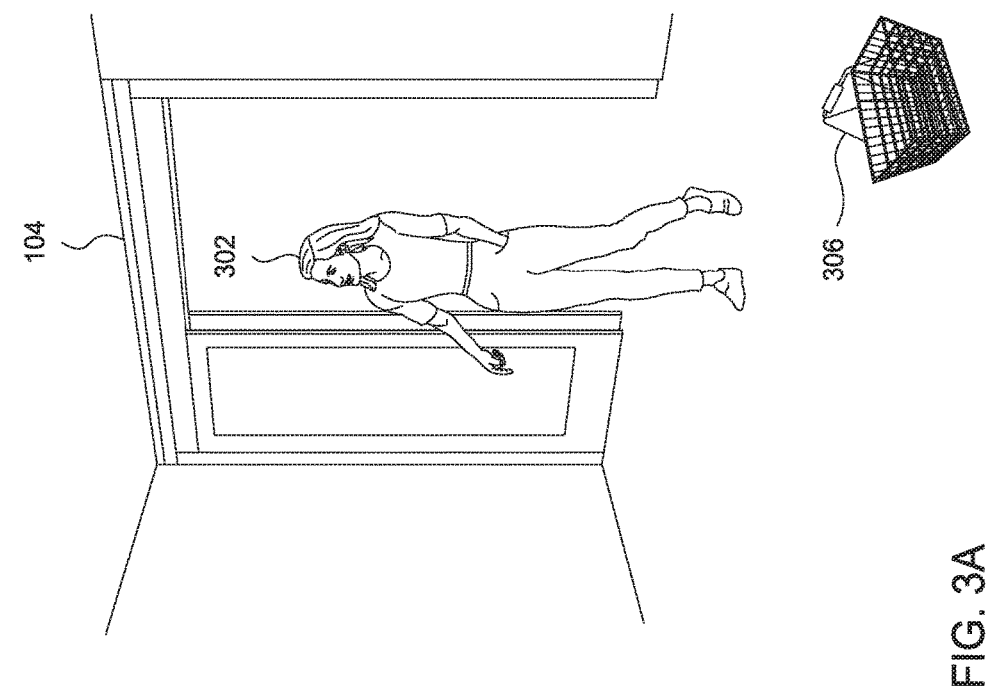
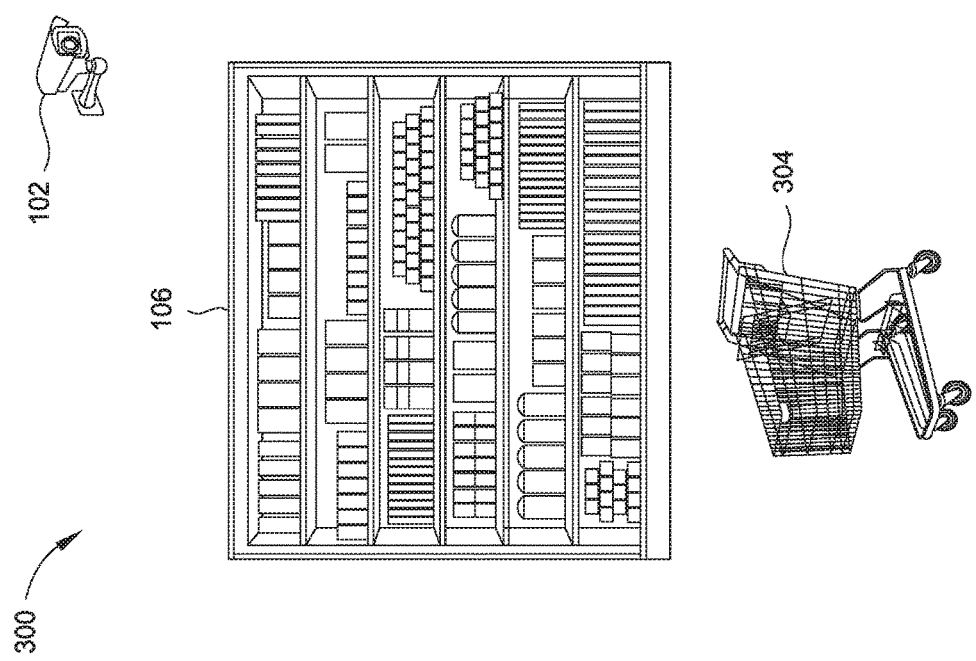
FIG. 3A

FACIAL VISIBILITY ~ 308

| IDENTIFICATION | EYES | NOSE | MOUTH | CHIN | FOREHEAD | EARS | HAIR | VISIBILITY SCORE |
|---|---|---|---|---|---|---|---|---|
| CUSTOMER 302 | 89 | 80 | 99 | 96 | 98 | 80 | 90 | 632 |

PERSON IDENTIFICATION ~ 310

| IDENTIFICATION | FACIAL RECOGNITION | HAIR | HEIGHT | WEIGHT | AGE | KNOWN FEATURES | PERSONAL DEVICE | IDENTIFICATION SCORE |
|---|---|---|---|---|---|---|---|---|
| CUSTOMER 302 | 75 | BROWN | 6' 1" | 225 | 36 | NA | NA | 98 |
| KNOWN CUSTOMER 123456 | | BROWN | 6' 1.5' | 215 | 33 | NONE | NONE | |

FIG. 3B

402 — STORE INVENTORY

| IDENTIFICATION | STATUS | DAYS UNTIL EXPIRED | # IN STOCK | # AVAILABLE | # ORDERED | SECURITY REQUIRED |
|---|---|---|---|---|---|---|
| | 404 | 406 | 407 | 408 | 410 | 412 | 413 |
| ITEM A | FRESH | 25 | 10 + 2 | 10 + 1 | 0 | 0 |
| ITEM B | FRESH | 5 | 5 | 5 − 1 | 5 | 3 |
| ITEM C | EXPIRED | 0 | 20 | 0 | 20 | 5 |
| ITEM D | FRESH | 20 | 0 + 5 | 0 | 10 − 5 | 1 |
| ... | ... | ... | ... | ... | ... | ... |
| ITEM n | U | V | W | X | Y | Z |

414 — CUSTOMER INFORMATION

LOYALTY #: 0123456  418

SECURITY QUALIFICATION: 419

KNOWN PERSONS  416
- NAME 1
- NAME 2
- NAME 3

ASSOCIATED PERSONS  420
- NAME 1
- CUSTOMER 3

PAYMENT TYPES  422
- CC #: 0011223344
- CASH BALANCE $ 12.34

VIRTUAL TRANSACTION  424

| ITEM I.D. | QUANTITY | LOCATION | PROMOTION | PURCHASED | SECURITY REQUIRED |
|---|---|---|---|---|---|
| 426 | 428 | 430 | 432 | 434 | 435 |
| ITEM 2 | 1 | CART | 50 % | N | 3 |

FIG. 4A

436 ∼ EMPLOYEE INFORMATION

| EMPLOYEE I.D. : ABC123 | 438 | | ON SHIFT : Y | 442 |
|---|---|---|---|---|
| HOURS WORKED : 24.0 | 440 | | ON BREAK : N | 444 |

SECURITY QUALIFICATION 446

| ON SHIFT 448 | OFF SHIFT 450 |
|---|---|
| 5 | 3 |

VIRTUAL TRANSACTION 452

| ITEM I.D. 454 | QUANTITY 456 | # DAMAGED 458 | LOCATION 460 | SECURITY REQUIRED 462 |
|---|---|---|---|---|
| ITEM 1 | 2 | 1 | SHELF | 0 |

464 ∼ VENDOR INFORMATION

| VENDOR I.D. : XYZ 466 | DELIVERY WINDOW : 1:00 PM - 3:00 PM WEDNESDAY 468 |
|---|---|

SECURITY QUALIFICATION 470

| ON SHIFT 472 | OFF SHIFT 474 |
|---|---|
| 4 | 1 |

VIRTUAL TRANSACTION 476

| ITEM I.D. 478 | QUANTITY 480 | # ORDERED 482 | LOCATION 484 | SECURITY REQUIRED 486 |
|---|---|---|---|---|
| ITEM 4 | 5 | 10 | TROLLEY | 2 |

FIG. 4B

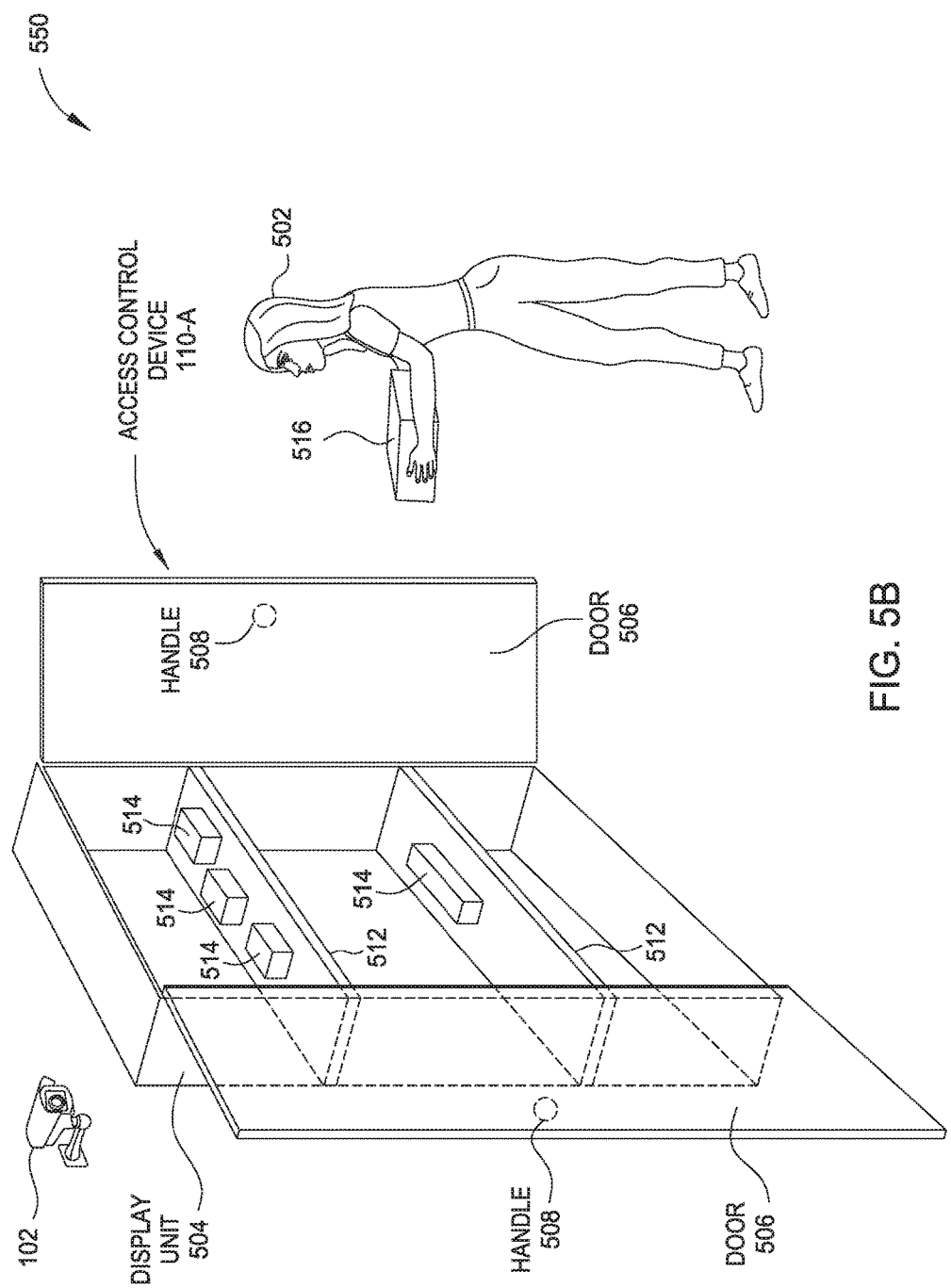

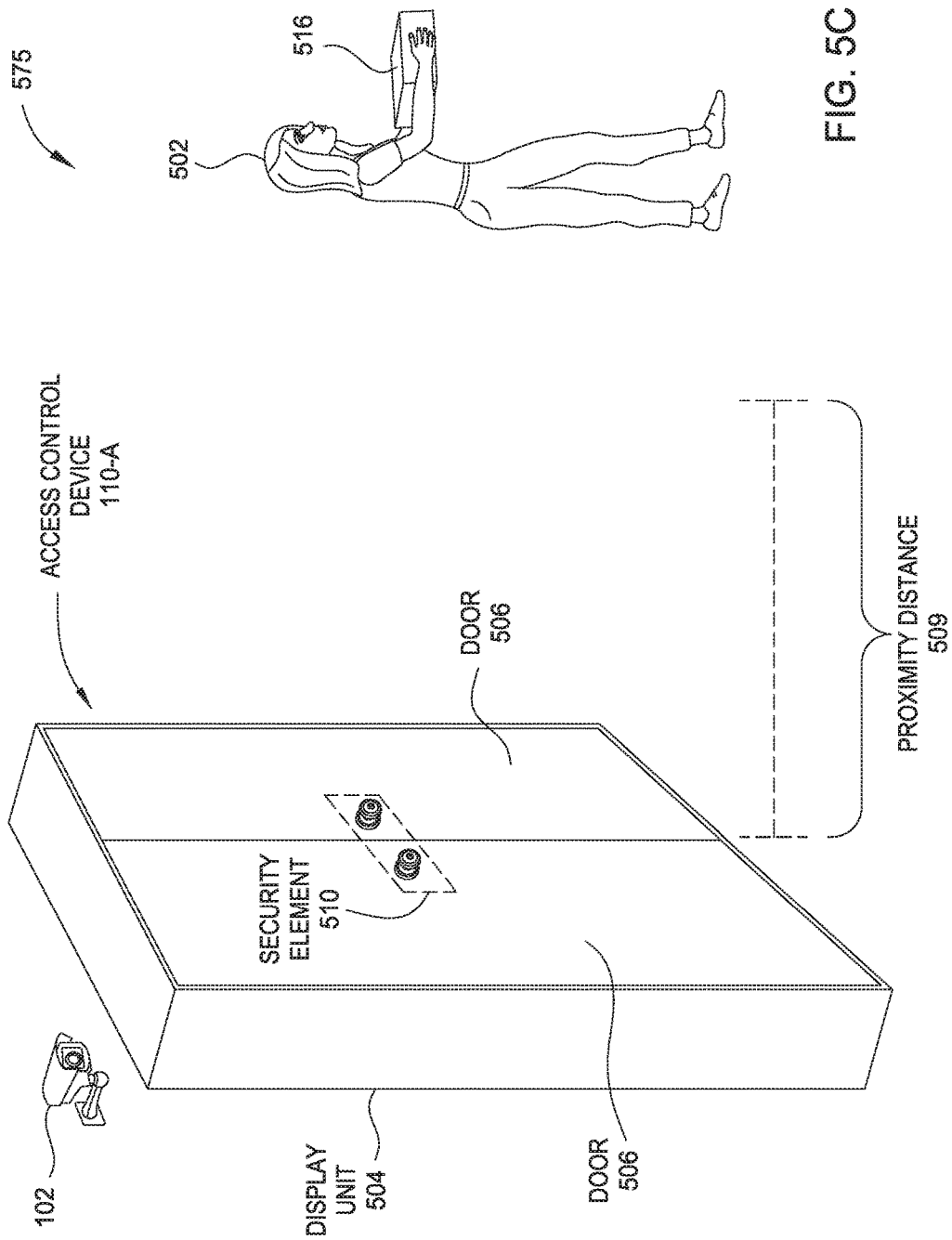

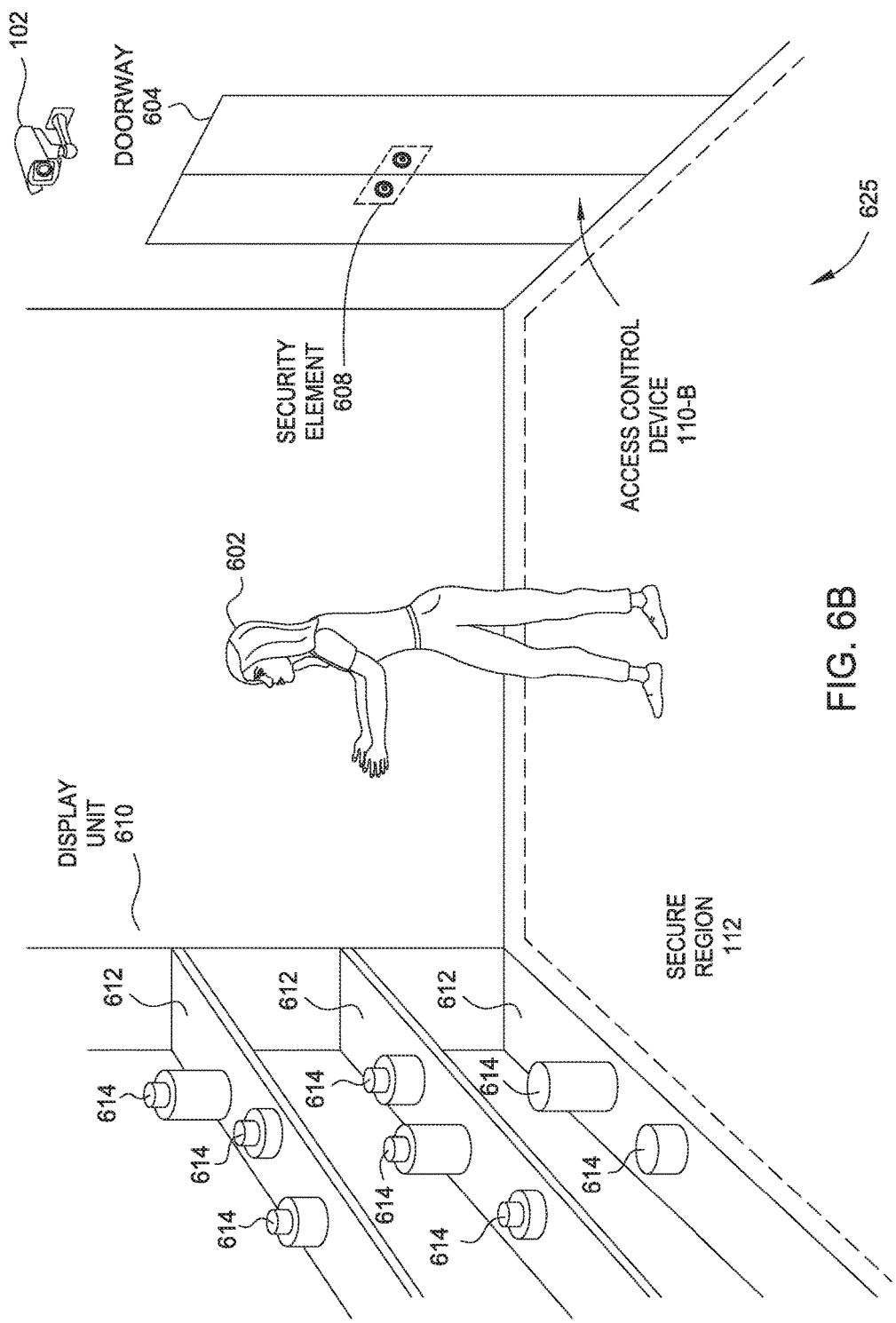

ACCESSING A SECURE REGION OF AN ENVIRONMENT USING VISUALLY IDENTIFIED BEHAVIORS RELATIVE TO AN ACCESS CONTROL DEVICE

CROSS-REFERENCE TO RELATED APPLICATIONS

This application is a continuation of co-pending U.S. patent application Ser. No. 15/415,309, filed Jan. 25, 2017. This application is also related to U.S. patent application Ser. No. 15/134,185, filed Apr. 20, 2016 and entitled "ASSOCIATING MULTIPLE PERSONS WITH A VIRTUAL TRANSACTION IN AN ENVIRONMENT". These applications are herein incorporated by reference in their entirety.

BACKGROUND

The present disclosure relates to an environment having a plurality of visual sensors disposed therein, and more specifically, to accessing a secure region of the environment using visually identified behaviors relative to an access control device at least partly defining the secure region.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

FIGS. 3A-3B illustrate an exemplary identification of a person within an environment, according to one embodiment.

FIGS. 4A and 4B illustrate exemplary data structures related to accessing a secure region within an environment, according to one embodiment.

FIGS. 5A-5C illustrate an exemplary access control device within an environment, according to one embodiment.

FIGS. 6A-6D illustrate accessing a secure region via an exemplary access control device within an environment, according to one embodiment.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Aspects of the current disclosure relate to an environment capable of selectively permitting physical access to a secure region defined therein. A number of different visual sensor devices are employed within the environment and networked to a controller to monitor a person's interactions with an access control device, through which the person may be permitted to physically access the secure region.

Using a system having one or more visual sensors within the environment, a retailer or other provider may compile and process acquired image data to selectively permit a person to physically access the secure region. The system may predict, or infer, the person's intent to access the secured region based on any number of visually observable actions, such as the person walking to a designated secure area within the environment and/or interacting with an access control device. Additionally, or alternatively, the system may attempt to determine the person's intent directly, such as by sending a notification to an electronic device associated with the person, and so forth. The system may be further configured to manage the inventory of items within the environment.

Using the system to streamline access to secure areas tends to reduce the amount of time spent by persons (e.g., customers, employees, and/or vendors) involved with accessing items included within the secure area. The system may further determine with increased accuracy which secured items are accessed, when compared with conventional access means. The reduced time and/or improved accuracy tends to result in greater customer satisfaction and a more efficient use of employees. For example, by allowing access to secured items in real-time during a customer's transaction within the environment, a retailer may reduce, or completely eliminate, the need to use employees to physically allow customers access to the secured items, as the customer may simply interact with a designated access control device within the environment. Using the visual sensor based system, a retailer can compile valuable data on the types of items being accessed, the types of customers who are accessing the secured items, and the employees accessing the secured items. While generally discussed within the context of a shopping environment, such as a retail store or other commercial environment, it is contemplated that the techniques disclosed herein may be applied to other environments (some non-limiting examples include libraries, museums, classrooms, hospitals, etc.) to provide a similar experience for persons included therein.

Figure 1:
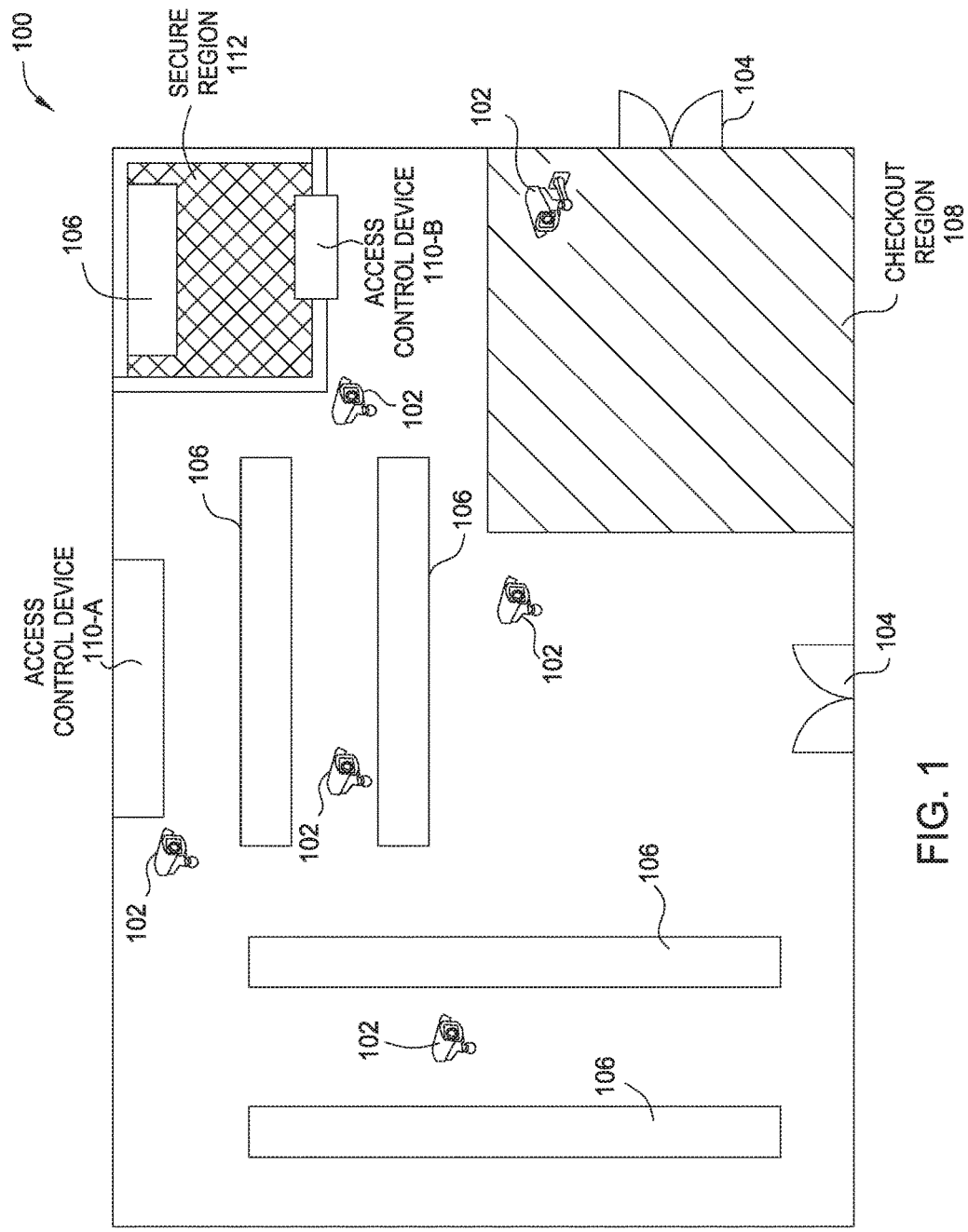
FIG. 1 illustrates an exemplary environment including a plurality of purchasable items and access control devices, according to one embodiment.

FIG. 1 illustrates an exemplary environment including a plurality of purchasable items, according to one embodiment. Environment 100 is depicted as a top-down plan view of an exemplary commercial environment. The environment 100 includes a plurality of display units 106 for displaying purchasable items. The environment 100 may be physically and/or logically separated into different regions so as to allow region-specific analysis to be performed. In an exemplary embodiment, the environment 100 includes a checkout region 108 and a secure region 112. Other embodiments of environment 100 may have different numbers and/or types of regions. The environment 100 includes access control device 110-A that controls physical access to secured items stored within the access control device 110-A. The environment 100 also includes access control device 110-B that controls physical access to the secure region 112. The access control devices 110-A and 110-B will generically be referred to with the reference number "110" and is to be understood to include both types of access control devices.

The environment 100 includes a plurality of visual sensors 102 disposed throughout the environment 100. Each of the visual sensors 102 includes one or more types of visual sensors such as visible light sensors (e.g., image or video cameras), infrared (IR) sensors, and so forth. Generally, the visual sensors 102 may be disposed at any suitable location within the environment 100. Some non-limiting examples of locations include below, within, or above a floor of the environment 100, and within other structural components of the environment 100 such as walls or ceiling structures. In some embodiments, the visual sensors 102 may be disposed on, within, or near item display areas such as a display unit 106. As will be explained in greater detail below, the visual sensors 102 are used to identify and monitor a plurality of persons within the environment 100 and interactions between the plurality of persons, the purchasable items, the access control devices, and the secure region 112. Although not shown, one or more additional types of sensors may be disposed within the environment 100, such as audio sensors (e.g., microphones), pressure sensors, and so forth. In some cases, the additional sensors may be collocated with the visual sensors 102. Further, other devices may be used with the visual sensors 102 such as speakers, displays, transmitters, and so forth.

In an exemplary embodiment, at least some of the visual sensors 102 are oriented towards doorways 104 or alternate areas of ingress and/or egress in order to identify customers entering and/or exiting the environment 100, as will be explained in further detail in FIG. 3A. At least some of the visual sensors 102 may be oriented towards the access control device 110-A to facilitate access to purchasable items stored within the access control device 110-A, which will be explained in more detail with regards to FIGS. 5A-5C. At least some of the visual sensors 102 may be oriented towards the access control device 110-B to facilitate access to purchasable items stored within the secure region 112, as will be explained in further detail in FIGS. 6A-6D. Further, at least some of the visual sensors 102 may be oriented towards display units 106 so as to capture interactions between customers and purchasable items located on the display units 106. The visual sensors 102 enable a touchless checkout through checkout region 108 so that a customer may purchase items from the environment 100 in a more efficient manner than typical checkout transactions.

Figure 2:
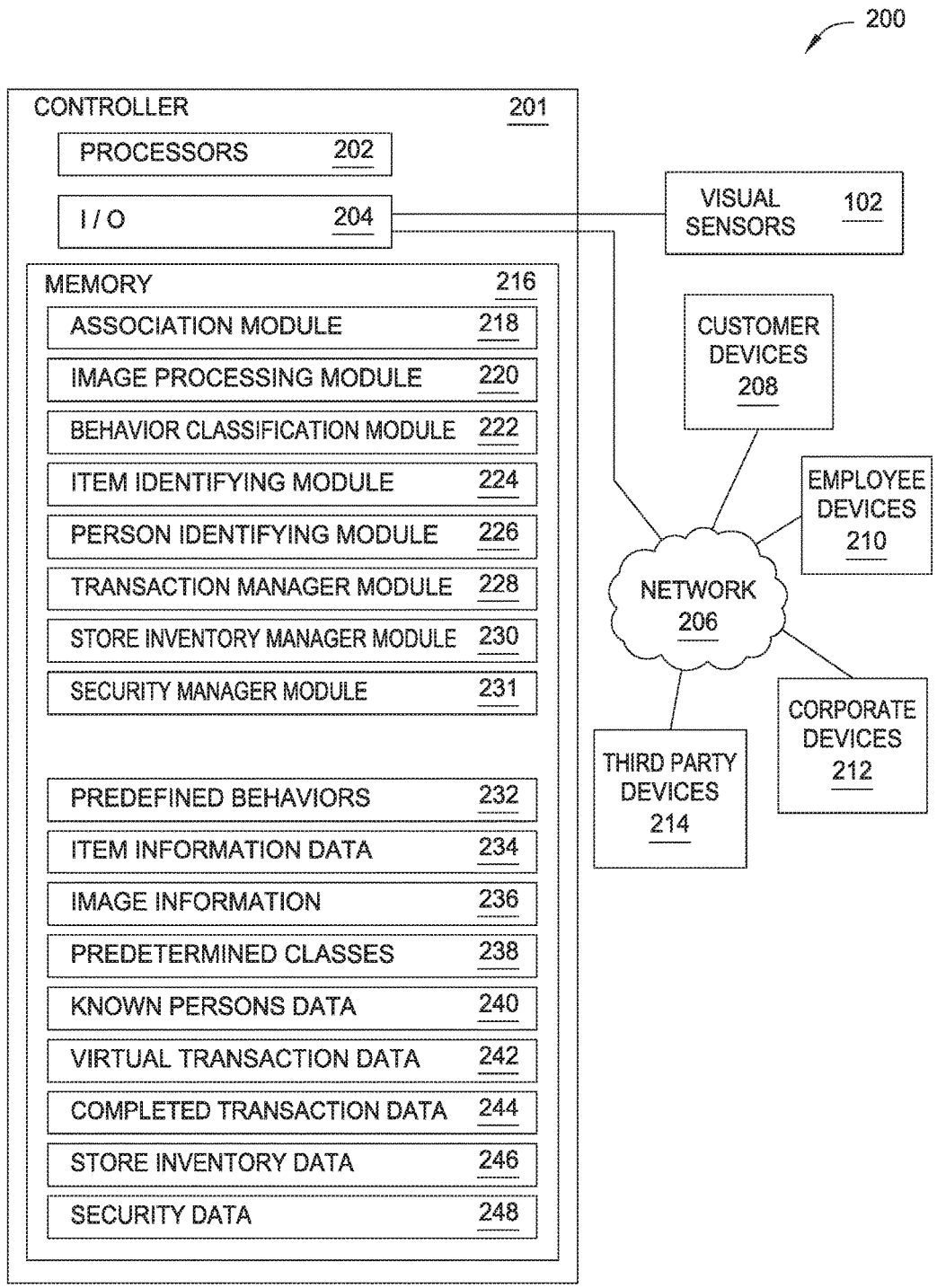
FIG. 2 is a block diagram illustrating operation of an exemplary system to facilitate accessing a secure region within an environment, according to one embodiment.

Turning to FIG. 2, an exemplary system 200 is shown for accessing a secured item via an access control device in an environment, according to one embodiment. The system 200 comprises a controller 201. The controller 201 has one or more processor(s) 202, input/output ports (I/O) 204, and a memory 216. In one embodiment, the controller 201 is implemented as a singular computing device having any suitable form. Some non-limiting examples of a computing device include a desktop computer, a laptop computer, a handheld computer such as a tablet or smartphone, a wearable computer, and a server. In other embodiments, controller 201 is distributed and includes a plurality of discrete computing devices that are connected through wired or wireless networking. The processor 202 may include any processing element suitable for performing functions described herein, and may include a single or multiple core processor, as well as combinations thereof. Processor 202 may be included in a single computing device, or may represent an aggregation of processing elements included across a number of networked computing devices, which may include devices such as the customer devices 208, employee devices 210, and so forth.

The controller 201 communicates with the visual sensors 102 via the I/O 204. For example, the controller 201 may receive image data from the visual sensors 102 for processing. The controller 201 is further connected through the I/O 204 to a network 206 to communicate with a plurality of computing devices, some of which may be disposed outside the environment 100. Network 206 may include one or more networks of various types, including a local area or local access network (LAN), a general wide area network (WAN), and/or a public network (e.g., the Internet). In one exemplary embodiment, the controller 201 communicates via network 206 with customer devices 208 to relay information helpful for customers within the environment 100 such as discounted items, coupons, item location information, step-by-step directions for accessing a secured an item, and so forth. The customer devices 208 may be mobile computing devices having any suitable form, such as handheld computing devices (e.g., tablets, smartphones) or worn computing devices (e.g., a head-mounted display, smartwatch). Further, the customer devices 208 may also be computing devices located within environment 100 that allow a customer to interact with the environment 100. For example, customer devices 208 may be a computer terminal (e.g., a kiosk or computer station) that a customer interacts with to facilitate the access of to a secured item or request assistance from an employee of environment 100.

The controller 201 is further configured to communicate with employee devices 210, which may also include mobile computing devices and/or stationary computing devices (e.g., terminals, desktop computers). In some embodiments, the controller 201 communicates notifications to employee devices 210 indicating various conditions occurring within the environment such as an item running out of stock, a spill in an aisle, a customer needing assistance, a person accessing a secure region, and so forth. The controller 201 may also facilitate communication between multiple networked devices such as the customer devices 208 and/or the employee devices 210. For example, the controller 201 may receive information from a customer device 208 indicating that a customer needs help accessing a secured item. The controller 201 may then communicate to an employee device 210 the location of customer device 208, as well as the problem to be solved.

The controller 201 may also communicate with one or more corporate devices 212 to facilitate ordering of items, sending customer data for analysis, tracking secured items, and so forth. The corporate devices 212 are computing devices having any suitable form, such as handheld computing devices (e.g., tablets, smartphones), worn computing devices (e.g., an optical head-mounted display, smartwatch), or stationary computing devices (e.g., terminals, desktop computers). The controller 201 may communicate with third party devices 214, such as computing devices associated with vendors, to order items, communicate status of shipments, communicate problems with items, etc. The third party devices 214 are computing devices having any suitable form, such as handheld computing devices (e.g., tablets, smartphones), worn computing devices (e.g., an optical head-mounted display), or stationary computing devices (e.g., terminals, desktop computers).

Memory 216 may include a variety of computer-readable media selected for their size, relative performance, or other capabilities: volatile and/or non-volatile media, removable and/or non-removable media, etc. Memory 216 may include cache, random access memory (RAM), storage, etc. Storage included as part of memory 216 may provide a non-volatile memory for the networked computing devices (e.g., employee devices 210, corporate devices 212), and may include one or more different storage elements such as Flash memory, a hard disk drive, a solid state drive, an optical storage device, and/or a magnetic storage device. Memory 216 may be included in a single computing device or may represent an aggregation of memory included in a plurality of devices.

For simplicity, the following paragraphs reference specific functional modules and data in explaining the functionality of controller 201, but are not intended to limit the embodiments of the present disclosure. The memory 216 stores a plurality of modules generally comprising program code, which when executed by the processor 202, perform a variety of functions for administering the environment 100. It is to be understood that each module and data are generally capable of communicating with all other modules and data within memory 216, such as through transmitted and received signals and/or shared portions of memory 216. The controller 201 encompasses the functionality of all modules and data described in the following paragraphs.

An image processing module 220 receives image information 236 from visual sensors 102, and performs image processing on the image information 236 according to known techniques. The image information 236 may be in any form suitable for identifying persons, items, and behaviors within the environment, such as full-motion video, still frames, etc. Based on the image processing provided by the image processing module 220, an association module 218 determines whether to associate or disassociate multiple persons within a transaction in the environment.

A behavior classification module 222 identifies one or more predefined behaviors 232 by identified persons within the environment 100. The predefined behaviors 232 comprise behaviors associated with interacting with items, which may include direct interactions of the person with one or more items and/or behaviors which generally increase or decrease a likelihood that the person will interact with the item(s). Further, the predefined behaviors 232 may comprise behaviors associated with accessing secured items, which may include direct interactions with an access control device within the environment 100, moving within environment 100 to subsequently interact with an access control device, and so forth.

Some non-limiting examples of predefined behaviors 232 include moving towards a display unit, adding an item to a display unit, removing an item from a display unit, holding an item, gesturing towards an item and/or a display unit, moving within a designated region, walking within environment 100, and so forth. The predefined behaviors 232 may also contain information on specific motions performed by a person within environment 100 such as reaching toward a handle, knob, or lever of the access control device, a gesture mimicking operating a handle, knob or lever of a door, a gesture mimicking opening an enclosure with dual doors, reaching toward the access control device, waving towards the access control device, performing a predefined hand gesture indicating approval while in proximity of the access control device, and mouthing a predefined word while in proximity of the access control device. Further, while some of the aforementioned non-limiting behaviors were described with reference to a display unit, it is to be understood any of the behaviors may be directed towards a display unit and/or an access control device 110. The transaction manager module 228 uses data representing the identified predefined behaviors 232 to add/remove items from a person's virtual transaction data 242.

Item identifying module 224 determines the identity of an item within the environment 100. Item identifying module 224 may identify the item based on visually observable properties of a container holding the item, based on properties of the item itself, a combination of the properties of the item inside and outside of its respective container, and so forth. Item identifying module 224 may use attributes of the item and/or container such as size, shape, weight, color, material (e.g., plastic, cloth, leather, etc.), text (e.g., brand name, item name, advertising language, etc.), graphics (e.g., logos, pictures, etc.), identifying codes (e.g., Universal Product Code, Quick Response Code, etc.), identifying tags (e.g., clothing tag, hang tags, etc.), identifying labels (e.g., International Standard Book Number, International Standard Serial Number, etc.), and electronic identifier (e.g., Radio Frequency Identification, magnetic strip, smart cards, etc.).

In one exemplary embodiment, item identifying module 224 compares the item's attributes to attributes within item information data 234 to determine the item's identity. The controller 201 may keep the item information data 234 up-to-date by adding and/or removing items as necessary. In one exemplary embodiment, item information data 234 is updated via network 206 from corporate devices 212 and/or the internet. In another exemplary embodiment, the item identifying module 224 may determine, based upon the identified attributes, that the item is not a part of the item information data 234. In some cases, the item identifying module 224 adds a new entry to the item information data 234 so the item may be identified in the future. Further, the item information data 234 may contain data on the security required for an item, which the controller 201 may update based upon the policies of environment 100.

The person identifying module 226 identifies persons within the environment 100 by identifying physical traits of persons such as gender, height, hair color, eye color, clothing, and so forth. The person identifying module 226 compares the aforementioned traits with known persons data 240 to determine if the identified person is a known person. Further, the person identifying module 226 determines which of a plurality of predetermined classes 238 a person within the environment 100 is a member. Some non-limiting examples of predetermined classes 238 include a customer, an employee, a vendor, etc.

For example, the person identifying module 226 may recognize a person as an employee within predetermined classes 238 having physical traits that match employee "John Doe" in known persons data 240. Thus, person identifying module 226 identifies the person as employee "John Doe," and controller 201 can now identify "John Doe" throughout the environment 100. In another example, person identifying module 226 may recognize the person as a customer within a particular predetermined class 238, but does not have traits matching the person in known persons data 240. The person identifying module 226 may identify the customer using a place holder such as "Customer 1," and controller 201 can now identify "Customer 1" throughout the environment 100.

The known persons data 240 may comprise data that was previously provided by persons wanting to be known to environment 100. In one exemplary embodiment, a person may provide various identification information to controller 201 such as image information containing the person's face, hair color, height, weight, age, and any other identifying information. The controller 201 may then store the provided information in known persons data 240 so that controller 201 is capable of identifying the person within environment 100 in the future. In another embodiment, a person wishing to be identified within environment 100 may simply acquiesce through a personal device, or a kiosk located within environment 100, to have various identifying characteristics read by the controller 201 via image analysis. That is, instead of having to manually provide information to controller 201, the controller 201 performs image analysis on one or more images containing the person determine the person's visually identify information. In this manner, the controller 201 is capable of identifying a person within environment 100 and storing the related data in known persons data 240.

Transaction manager module 228 monitors and adaptively updates the various transactions for each of the persons within the environment 100. The transaction manager module 228 uses data from person identifying module 226 to create virtual transaction data 242 for each of the identified persons within environment 100. Virtual transaction data 242 contains dynamically updated information related to transactions between the person and the environment 100, such as items associated with the person, the number of items, and so forth. The transaction manager module 228 uses data representing the identified predefined behaviors 232 to add/remove items from a person's virtual transaction data 242.

Transaction manager module 228 is further configured to monitor and/or store completed virtual transactions for each of the persons in the environment 100. The completed transaction data 244 stores information related to virtual transactions that have been completed (e.g., items purchased by a customer) within the environment 100. The completed transaction data 244 comprises purchase confirmation information, which may include the quantity of the item sold, the date the transaction was completed, the person associated with the transaction, payment method used, whether the item was sold on sale, the condition of the item at time of sale, the store identification, a transaction identification, shipping information, and so forth.

Store inventory manager module 230 monitors the store inventory data 246 within the environment 100. Store inventory data 246 comprises information on the various items within environment 100. Some non-limiting examples include number in stock, number available, number ordered, security required to handle an item, and so forth. Store inventory manager module 230 may use data from behavior classification module 222 to update the store inventory data 246 based on the behavior associated with the identified person. The transaction manager module 228 may notify store inventory manager module 230 that an item has been added/removed from a person's virtual transaction data 242, and the store inventory manager module 230 updates the store inventory data 246 as necessary. Further, store inventory manager module 230 may be capable of tracking specific items throughout environment 100 such that controller 201 knows the location of all items at any given time. Thus, the store inventory manager module 230 is configured to monitor various items within the environment 100 in real-time.

Security manager module 231 manages the security qualifications of persons and items within environment 100. The security manager module 231 may use information stored within store inventory data 246 and/or item information 234 to determine the security qualification a person is required to have in order to access and/or purchase items within environment 100. For example, the security manager module 231 may use person identifying module 226 to determine the identity of a person within environment 100 such as "Customer Alpha." After determining the identity of "Customer Alpha," the security manager module 231 may use the known persons data 240 to determine the security qualification of "Customer Alpha," which determines the access control devices 110 "Customer Alpha" can unlock. Thus, the security manager module 231 may allow persons to unlock access control devices 110 within environment 100 in real time in order to access secured items, without the assistance of an employee.

Turning to FIG. 3A, an exemplary identification of a person within an environment is illustrated, according to one embodiment. Generally, view 300 illustrates exemplary operation of the controller 201 of FIG. 2 within the environment 100. As shown, a customer 302 is entering through doorway 104 into environment 100. While a single customer 302 is shown for simplicity, the techniques discussed herein may apply to multiple persons within the environment 100. In an exemplary embodiment, as customer 302 enters through doorway 104 into the environment 100, at least one of the visual sensors 102 is oriented to acquire image information 236 (FIG. 2) including the customer 302. The acquired image information 236 may be used by controller 201 to identify the customer 302. Additionally, the controller 201 may be further configured to visually identify transactional items used by the customer 302 within the environment 100, such as a shopping cart 304 and/or shopping basket 306. Based on visually observed interactions of the customer 302 with the shopping cart 304 and/or the shopping basket 306, the controller 201 may associate the shopping cart 304 and shopping basket 306 (and any items stored therein) with customer 302 for the associated virtual transaction.

The controller 201 may take into account various visually observable attributes of the customer 302 when determining the identity of customer 302. Some non-limiting examples include gender, age, height, weight, hair color, eye color, skin tone, and tattoos. The controller 201 may perform identification based on one or more additional attributes, such as a time of day, clothing worn by the customer 302, jewelry, and so forth. For example, the controller 201 determines that the customer 302 is female, approximately 5 feet tall, has long brown hair and blue eyes, is approximately 32 years old, and entered the environment 100 at 6:00 P.M.

In another exemplary embodiment, the controller 201 may perform identification based on the presence of a customer device 208 (FIG. 2) such as a smartphone. The customer device 208 may notify the controller 201 via network 206 that customer 302 has entered the environment 100. Alternatively, the controller 201 may recognize the customer device 208 as a device previously registered in known persons data 240 (FIG. 2), and may identify customer 302 based on this association.

In some embodiments, the determined attributes can be collected anonymously (i.e., without association to any personally identifying information) to protect and respect customer privacy, but this is not a requirement. For example, the controller 201 may use some or all of the determined attributes to identify customer 302 as "Customer A." After identifying "Customer A," in some cases the controller 201 deletes some or all of the determined attributes, as the controller 201 may subsequently track the customer 302 as "Customer A." In this way, the controller 201 need not store all determined information related to customer 302 throughout environment 100 once identified. Rather, a placeholder can be used to track customer 302 and the virtual transaction can be associated with the placeholder.

In another exemplary embodiment, customer 302 has previously provided information to the controller 201 and/or allowed the controller 201 to store information on customer 302. For example, after recognizing the various attributes of the customer 302, the controller 201 may recognize the identified customer 302 as a known person from known persons data 240 (i.e., customer 302 is a loyalty member of, or has previously been within, the environment 100). Thus, the controller 201 may use the visually determined attributes to associate the customer 302 with a specific known person (e.g., "Jane Doe" having loyalty number "0123456"). While FIG. 3A has been described as assuming the identified person is a customer for simplicity, it should be understood that the controller 201 determines which predetermined class 238 the identified person within the environment 100 belongs. That is, the controller 201 identifies customers as well as other classes of persons within the environment 100 such as employees, vendors, etc.

Turning to FIG. 3B, an exemplary facial visibility 308 calculation and person identification 310 calculation are illustrated in relation to customer 302 shown in FIG. 3A. Persons within environment 100 may be wearing clothing and/or accessories, or have a hairstyle which obscures their face such that controller 201 is not capable of properly identifying them. For example, a customer may enter environment 100 wearing a hat and sunglasses, which cover such a significant portion of the customer's face that said customer is impossible to identify using image analysis. As another example, the visual sensors 102 may not have been able to capture all of a person's face because the person was facing away from the visual sensors, the image information is blurry, or another technical problem arose that prevents a person's face being completely visible to the controller 201 even though no physical items are covering the person's face. Thus, the controller 201 may determine how visible a person's face is in order to ensure the controller 201 is capable of properly identifying said person.

In one exemplary embodiment, if the controller 201 determines the person's face is too obscured, the controller 201 may notify an employee via an employee device 210 (FIG. 2) so that the employee can identify the person. In another exemplary embodiment, the controller 201 determines that a customer's face is too obscured, and the controller 201 sends a notification to a customer device 208 (FIG. 2) associated with said customer informing them that they are not able to be identified. Thus, the controller 201 is capable of determining when a person is unable to be identified based on the person's facial visibility.

As shown in FIG. 3B, the facial visibility 308 calculation contains data on identification 312 of the person, as well as the visibility of their eyes 314, nose 316, mouth 318, chin 320, forehead 322, ears 324, and hair 326 to calculate a visibility score 328. In one exemplary embodiment, the controller 201 uses one or more visual sensors 102 located within environment 100 to capture images containing persons and performs image analysis on the captured images to calculate the persons facial visibility. Identification 312 contains data on the person whom the controller 201 is determining the facial visibility score 328 for, which as shown is customer 302 (i.e., the same customer from FIG. 3A). In one exemplary embodiment, identification 312 is merely a placeholder for a person within environment 100. That is, controller 201 has not identified customer 302 as a known person yet so the controller labels the person with a placeholder until the person is identified. In this manner, the controller 201 is able to track customer 302 throughout the environment 100 without identifying customer 302.

As illustrated, the facial visibility score 328 is a score that is based upon how visible different parts of the face are. In one exemplary embodiment, the visibility score 328 is the summation of the determined visibility scores of the person's eyes 314, nose 316, mouth 318, chin 320, forehead 322, ears 324, and hair 326. The aforementioned facial features are scored on a scale of one to one hundred (1-100). Thus, in this example, the visibility score 328 has a maximum possible score of seven hundred (700). The controller 201 may have a predetermined minimum visibility score 328 in order to identify a person, such as a visibility score over six hundred (600) represents that a person's face is sufficiently visible to properly identify said person. Thus, as shown, the visibility score 328 of six hundred thirty-two (632) meets the minimum visibility required to properly identify a person. While the visibility score 328 was described as a summation of various facial features, the visibility score 328 may be determined using any other suitable arithmetic and/or logical functions, such as a weighted sum of parameter values, comparing parameter values with thresholds to produce a binary decision for each, fuzzy logic, and so forth.

In one exemplary embodiment, the controller 201 first determines whether customer 302's face is visible enough using the facial visibility 308 before determining the person's identification calculation. To identify a person within environment 100, the controller 201 may use the person identification 310 calculation as shown in FIG. 3B. In one exemplary embodiment, the controller 201 compares the characteristics of an unidentified person within environment 100 to the characteristics of persons known to controller 201 to determine the identity of the unidentified person. That is, the controller 201 may use known persons data 240 (FIG. 2), which contains information on persons previously identified to determine the identity of the person.

As shown in FIG. 3B, the person identification 310 calculation contains data on the identification 330 of the person, facial recognition 332, hair 334, height 336, weight 338, age 340, known features 342, and a personal device 344 associated with the person to determine an identification score 346. In the example depicted, the identification score 346 has a maximum possible score of one hundred (100). While a scale of one to one hundred (0-100) is used for simplicity, is to be understood any range and/or value may be used such as a binary scale, written descriptions (e.g., identified), and so forth. The identification score 346 may be determined using any suitable arithmetic and/or logical functions, such as a weighted sum, comparing parameter values with thresholds to produce a binary decision for each, fuzzy logic, and so forth.

The controller 201 may compare the identification score 346 with a threshold value to determine that a match exists between the unknown person and the known person. For example, an identification score 346 over seventy-five (75) indicates that the unknown person and the known person are the same. Thus, the identification score 346 represents the probability that the unknown person is the known person. That is, in FIG. 3B the identification score 346 represents the likelihood that customer 302 is in fact Known Customer 123456.

The controller 201 may perform a facial recognition analysis on one or more images captured from the visual sensors 102 located throughout the environment 100 to assist in identifying a person. Generally, facial recognition uses the unique characteristics of a person's face to identify said person. As shown in FIG. 3B, the controller 201 may compare the facial recognition analysis to a known person's facial recognition data to determine a facial recognition 332 score. In the example depicted, the facial recognition 332 score has a maximum possible score of one hundred (100), with one hundred being a perfect match between the unidentified person and the known person.

The person identification 310 calculation contains data on the hair 334, height 336, weight 338, and age 340 of the unknown and known persons, which the controller may compare in determining the identification score 346. The controller 201 may perform image analysis on one or more images captured from the visual sensors 102 to determine the aforementioned parameters of an unknown person within environment 100. As illustrated, the controller 201 determined that unknown person customer 302 has brown hair 334, has a height 336 of six feet one inch, a weight 338 of two hundred twenty-five (225) pounds, and an age 340 of thirty-six (36). The controller may then compare these determined characteristics with known persons data 240 (FIG. 2) when calculating the identification score 346. While hair 334 has been illustrated as a color of the hair, hair 334 may include data on the hair style, length of hair, and so forth. While the person identification 310 calculation has been illustrated with only seven variables for simplicity, the invention should not be limited to such. The person identification 310 calculation can take into more or less variables, including variables of different types.

The controller 201 may also take into account known features 342 of persons in determining the identification score 346. Known features 342 are features of a person that may help identify a person, but do not fall into the aforementioned categories. Some non-limiting examples of known features 342 may include tattoos and body art, scars, medical devices (e.g., a wheel chair, hearing aids, cane, and so forth), and other readily identifiable features. As illustrated in FIG. 3B, customer 302 does not have any that the controller 201 would classify as known features 538. Thus, the controller 201 determines that customer 302's known features 342 are not applicable (NA) or do not impact the identification score 346.

The controller 201 may also take into account whether a person has a personal device 344 that has previously been registered with environment 100. The personal device 344 may be a customer device 208 (FIG. 2), an employee device 210 (FIG. 2), or any electronic device which may help identify a person. The controller 201 may compare the device registered with the known person to the device associated with the unknown person to help determine the identification score 346. As illustrated, the unknown person customer 302 does not have a personal device 344. Thus, the controller 201 determines the personal device 344 is not applicable (NA) or does not impact the identification score 346.

As mentioned above, the controller 201 compares the parameters of the unknown person listed in person identification 310 to the parameters of the known person listed in person identification 310 to determine the identification score 346. In the illustrated example, the controller 201 determines that customer 302 and known customer 123456 have an identification score 346 of ninety-eight (98) out of a maximum possible score of one hundred (100), which represents a very strong likelihood that customer 302 and known customer 123456 are in fact the same person. The controller 20 may compare the identification score 346 with a threshold value to determine a match exists between the unknown person and the known person. For example, an identification score 346 over seventy-five (75) indicates that the unknown person and the known person are the same. Thus, the identification score 346 represents the probability that the unknown person is the known person. That is, in FIG. 3B the identification score 346 represents the likelihood that customer 302 is in fact known customer 123456.

Figure 5A:
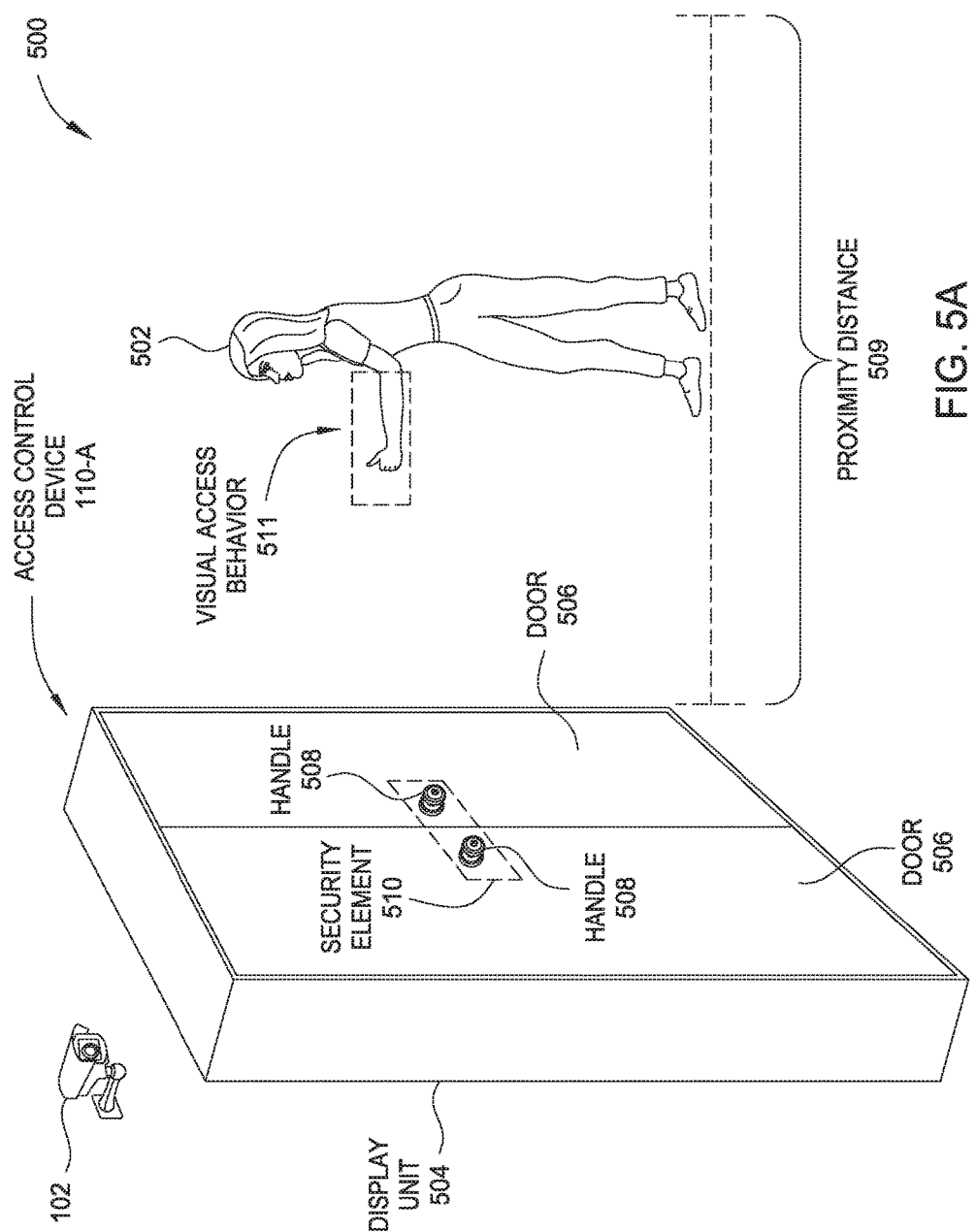

In one exemplary embodiment, the controller 201 may then use the information stored in known persons data 240 (FIG. 2) to determine whether the security qualification of customer 123456 allows them to open security access control device 110-A (FIG. 5A). In this manner, the controller 201 is capable of identifying a person and determining whether the person should be allowed access to the secured items. While the facial visibility 308 and person identification 310 calculations have been described with reference to a person attempting to open an access control device, the invention should not be limited to such. For example. The controller 201 may determine the facial visibility 308 and person identification 310 when a person enters environment 100 as described with regards to FIG. 3A, before a person enters environment 100, or at any point in time.

FIGS. 4A-4B illustrate exemplary data structures related to maintaining virtual transactions within an environment, according to one embodiment. An exemplary store inventory data 246 (FIG. 2) of environment 100 is shown in FIG. 4A as store inventory 402. The controller 201 may keep track of the number of purchasable items being sold to customers or stocked by employees via store inventory 402 to keep an up to date list of the items within the environment 100 in real time. The store inventory 402 contains a plurality of items A, B, C, D, . . . n. Any amount of items may be tracked by the store inventory 402 and items A-D are used for simplicity. The store inventory 402 may comprise columns relating to particular properties of each item such as identification 404, status 406, days until expired 407, number in stock 408, number available 410, the number ordered 412, and the security required 413. The identification 404 may identify a purchasable item by a visual identifier such as a Universal Product Code (UPC) or quick response (QR) code, a location of the purchasable item within the environment 100, and/or other distinguishing parameters.

In one exemplary embodiment, the controller 201 may track the status 406 of purchasable items, such as if the item is past its expiration date or is still fresh. Further, the controller 201 may monitor the days until expired 407 of the individual items. For example, the controller 201 may recognize that item B only has five days until expired 407 and may preemptively order more of Item B so as to replace the stock when the status 406 changes from "Fresh" to "Expired." This may allow the environment 100 to increase customer satisfaction by reducing the time items are out of stock.

While the data structure has been described as a store inventory 402 for simplicity, the controller 201 may use any number and type of inventory data for environment 100. For example, the controller 201 may have a separate inventory for each of the display units 106 (FIG. 1) or access control devices 110 (FIG. 1) located within environment 100. Further, the controller 201 may have a separate inventory for the secure region 112 (FIG. 1). The inventories associated with the environment 100 will be generically referred to as the store inventory 402 and is to be understood to include the aforementioned types of inventory.

The controller 201 may also track the number in stock 408 compared to the number of items available 410 within the environment 100. For example, when a customer adds one (1) of item B to their virtual transaction, the number available 410 for item B is reduced by one (1), but the number in stock 408 for item B still has five (5) items in stock 408 as the customer 302 has not yet completed the transaction. In this way, the controller 201 is able to track items as soon as the item is associated with a customer until the customer completes the transaction. The controller 201 may further track a number ordered 412 of particular items. For example, the system may recognize item C has a status 406 of "Expired" so it is no longer available for sale, which is reflected in item C having zero (0) as the number available 410. The controller 201 may order more, twenty (20) as shown, to replenish the stock which is reflected by the number ordered 412.

The controller 201 may also track the security required 413 to be in possession of items within environment 100. As shown, the security required 413 ranges from zero (0), meaning no security requirement, to five (5), meaning the highest security requirement. While a scale of zero to five (0-5) is used for simplicity, is to be understood any range and/or value may be used such as a one hundred (100) point scale, a binary scale, written descriptions (e.g., level one), and so forth. In one exemplary embodiment, an item having a security required 413 of zero (0), such as item A, is accessible by anyone and is not secured behind an access control device 110 (FIG. 1). For example, all of the items on the display units 106 (FIG. 1) have a security required 413 of zero (0). The environment 100 may have a policy in place that certain items secured behind an access control device 110 are only accessible by people meeting a certain security requirement. For example, item B may be an item that is only accessible by persons who are 18 or older. The environment 100 may determine a security qualification/status that reflects persons who are 18 or older, such as three (3), which is shown for item B. As a further example, item C may be an expensive bottle of wine that the environment 100 only wants a manager on duty to have access to. Item C may be securely stored behind a control access device 110 so that only persons meeting the requisite security qualification can access item C. The controller 201 may use the security required 413 of items to allow persons access to items via an access control device 110, which will be explained in more detail with regards to FIGS. 5A-5C and 6A-6D. Thus, the controller 201 is capable of keeping track of the various purchasable items, as well as access to secured items, within the environment 100 using store inventory 402 in real time.

An exemplary data structure for individual customer information 414 is illustrated in FIG. 4A. The customer information 414 contains data on known persons 416, loyalty number 418, security qualification 419, associated persons 420, payment types 422, and virtual transaction 424. Known persons 416 contains information on persons having visually observed association(s) with an individual customer or were previously added to customer information 414 by an individual customer. As shown, customer information 414 contains information on three known persons 416: Name 1; Name 2; and Name 3. Known persons 416 may be people the customer regularly enters the environment 100 with such as family members, friends, co-workers, and so forth. The controller 201 may store information on the various known persons 416 so as to better associate the known persons 416 with the customer 414 on a single virtual transaction 424. The controller 201 distinguishes between known persons 416 and associated persons 420 to encompass situations where a person associated with the customer is not a known person.

Associated persons 420 may be persons whom the controller 201 recognizes should be associated with a single virtual transaction, such as members of a family within environment 100 together being on a single transaction. As shown, associated persons 420 includes information for "Name 1," which is also a known persons 416, and "Customer 3." "Customer 3" may be a friend of the aforementioned family who is shopping with the family in environment 100. The controller 201 recognizes "Customer 3" should be associated with the family based on interactions between the family and "Customer 3," even though "Customer 3" is not a known person. In this manner, the controller 201 can recognize associated persons 420 even if they are not known persons 416.

Customer information 414 also contains data on the security qualification 419 of the customer. As shown, the security qualification 419 is on a scale from zero (0) to five (5), with the customer having a security qualification 419 of three (3). While a numeric scale from zero to five (0-5) has been used for simplicity, the security qualification may be any suitable scale and/or logic for evaluating and/or representing a security qualification. Some non-limiting examples include 1-100, binary, position (e.g., employee, manager, customer, etc.), a weighted value based on various parameters, and so forth.

The security qualification 419 may be determined by controller 201 based on certain characteristics of the customer such as age (e.g., old enough to purchase age restricted items), loyalty level (e.g., has shopped at store sufficient number of times to be considered trustworthy), and so forth. The security qualification 419 may also be determined by the environment 100 (e.g., a default security qualification) such that the controller 201 is provided with the determined security qualification of the person.

Further, the security qualification 419 may also be based upon information provided by the customer. For example, an employee of environment 100 may check the identification of the customer to verify the customer is a certain age (e.g., at least 18 years old) and provide this information to controller 201. The controller 201 may then determine the security qualification for the customer based upon the provided information. The controller 201 may use the security qualification 419 of a customer to allow the customer access to secured items via an access control device 110 (FIG. 1), which will be explained in more detail with regards to FIGS. 5A-5C and 6A-6D.

Further, customer information 414 also contains information on different payment types 422. As shown, payment types include a credit card (CC#) as well as a cash balance stored with the environment 100, but may include any suitable alternate payment method, such as a virtual currency. For example, a customer may have associated credit card information with their loyalty number 418 and deposited cash with the environment 100. By using the payment information included in payment types 422, the customer may seamlessly checkout using one of the payment types 422.

For example, as the customer interacts with purchasable items and/or transactional items within the environment 100, the controller 201 may add items to the customer's virtual transaction 424. The customer may then proceed to checkout region 108 as shown in FIG. 1. Once the customer has entered the checkout region 108, the controller 201 may recognize the customer stored a payment type 422 and automatically charge, or debit, the selected payment type 422 for the items included in the virtual transaction 424. In this manner, a purchase transaction is completed between the environment 100 and the customer without the need to go through conventional checkout processes.

Customer information 414 also contains information on the virtual transaction 424. The virtual transaction 424 may contain information on items such as item identification 426, quantity 428 of the item, location 430 of the item such as in a cart 304 (FIG. 3A), a promotion 432 such as a discount, whether the item has been purchased 434, and the security required 435 of the item. The controller 201 may add an item to the virtual transaction 424 (or remove an item from the virtual transaction 424) based on the customer's visually observed interactions with purchasable items. The controller 201 may use the security required 435 in conjunction with the security qualification 419 to ensure that the customer is supposed to be handling the item. For example, the controller 201 may recognize that item 2 has a security required 435 of three (3), and the controller 201 compares the security qualification 419 to verify the customer has the proper qualification to be handling item 2.

In one exemplary embodiment, upon determining a customer has an item they are not qualified to possess, the controller 201 may notify an employee of environment 100 via an employee device 210 (FIG. 2) to take any actions necessary to remedy the problem. For example, a person under the age of twenty-one (21) may have gained possession of an item which should only be in possession of a person twenty-one (21) or older. The controller 201 may determine the person under twenty one should not be in possession of the item, and notify an employee of environment 100 of the situation so that the employee may take any necessary actions to remedy the issue. In this manner, the controller 201 has the capability to ensure that no customer is in possession of an item they are not supposed to have.

The controller 201 may also use a data structure for storing employee information 436. As shown in FIG. 4B, employee information 436 contains an employee identification (I.D.) 438, hours worked 440, whether the employee is on shift 442, whether the employee is on break 444, a security qualification 446, and a virtual transaction 452. The controller 201 may monitor the hours worked 440 to ensure the employee is working the appropriate amount of time (e.g., working the minimum required, not going into overtime, etc.).

The controller 201 may also monitor whether the employee is on shift 442 and on break 444. This can allow the controller 201 to ensure employees are properly clocking in/out as well as receiving breaks. For example, the controller 201 may recognize an employee is entering the environment 100 and may then check whether the employee is supposed to be on shift 442 and clock the employee in. In another example, the controller 201 may recognize an employee has not taken their lunch break as required and send a reminder to an employee device 210 (FIG. 2) associated with the employee to inform them to take a break.

Employee information 436 contains data on the security qualification 446 for an employee. As shown, the main difference between the security qualification 419 (FIG. 4A) for a customer and the security qualification 446 for an employee is that the employee's security qualification 446 takes into account whether the employee is on shift 448 or off shift 450. That is, the controller 201 may assign a different security qualification 446 to the employee when they are working versus when they are not, although this is not necessary. While this exemplary embodiment uses on shift vs off shift, it is to be understood that the controller 201 may use any parameter to determine the employee's security qualification 446 such as position (e.g., manager), age, time of day, or any other parameter. Further, the controller 201 may use any logic for evaluating and/or representing a security qualification of the employee.

In one exemplary embodiment, the employee illustrated in FIG. 4B may be a manager within environment 100 that has access to every part of the environment 100 while working in their capacity as manager. Thus, the employee has an on shift 448 security qualification 446 of five (5), which is the highest security qualification in this example. However, the environment 100 may have a policy that only a manager on duty has the ability to access certain secured items. Thus, when the employee is not working, the environment 100 may want to limit the employee's security access, which is why the employee has a security qualification 446 of three (3) when the employee is off shift 450. In this manner, the controller is able to determine whether an employee should have access to secured items via an access control device 110 based upon whether the employee is working or not.

Employee information 436 contains a virtual transaction 452. In some embodiments, the virtual transaction 452 maintained for an employee differs in content from the virtual transaction 424 maintained for a customer. Virtual transaction 452 contains information such as an item I.D. 454, quantity of the item 456, whether an item is damaged 458, location of the item 460, and security required 462 to be in possession of the item. The controller 201 may update the virtual transaction 452 of an employee based on interactions with items in environment 100. For example, an employee may be stocking item A within the environment 100 and one (1) of item A is damaged 458. The controller 201 may recognize an item is damaged or the employee may inform the system that an item is damaged. After being informed of the damaged item, the controller 201 will appropriately update the virtual transaction 452 as well as update the store inventory 402 (FIG. 4A).

The controller 201 may use the security required 462 for an item in conjunction with the security qualification 446 to ensure an employee is not in possession of an item above their security qualification 446. For example, environment 100 may have items which should only be handled by a manager. The controller 201 may recognize that an employee's virtual transaction 452 contains an item with a security required 462 higher than the employee's security qualification 446. The controller 201 may then take remedial actions based on this determination such as notifying a manger on duty within environment 100, informing the employee, and so forth. In this manner, the controller 201 has the ability to ensure that no employee possess an item they should not have access to.

The controller 201 may have a data structure containing vendor information 464. As shown in FIG. 4B, vendor information 464 contains a vendor I.D. 466, delivery window 468, a security qualification 470, and a virtual transaction 476. The vendor I.D. 466 may be used to easily identify a vendor when the vendor enters the environment 100. The controller 201 may use delivery window 468 to recognize when more of a specific item will be stocked, or when the vendor is should be present within environment 100 and on shift.

The virtual transaction 476 contains item I.D. 478, quantity 480, number ordered 482, location 484, and security required 486 to be in possession of the item. In some embodiments, the virtual transaction 476 for a vendor differs in content from the virtual transaction 424 (customer) and/or virtual transaction 452 (employee). The controller 201 may use the virtual transaction 476 to update the store inventory 402. For example, a vendor may be delivering item D. The vendor may have only brought five (5), the quantity 480, of item D even though the controller 201 had ordered ten as shown by number ordered 482. The controller 201 may also recognize the location 484 of item D as being on a trolley associated with the vendor. Thus, the controller 201 is able to update the store inventory 402 in real time based on the vendor information 464.

Vendor information 464 contains data on the security qualification 470 of the vendor. Similar to the employee security qualification 446, the vendor security qualification 470 takes into account whether the vendor is on shift 472 or off shift 474. While this exemplary embodiment uses on shift vs off shift, it is to be understood that this is not necessary and the controller 201 may use any parameter to determine the vendor's security qualification 470 such as age, time of day, or any other parameter. Further, the controller 201 may use any logic for evaluating and/or representing a security qualification 470 of the vendor. The controller 201 may use the security required 486 for an item in conjunction with the security qualification 470 of the vendor, similar to the employee information 436 and customer information 414, to ensure the vendor is not in possession of an item above their security qualification 470.

Turning to FIG. 5A, an exemplary access control device within environment 100 is illustrated, according to one embodiment. As shown, the access control device 110-A comprises a display unit 504 comprising doors 506 enclosing purchasable items stored on shelves (not shown), which may be operated by a customer 502 using handles 508. While a customer is displayed The display unit 504 further comprises a security element 510 such as a locking mechanism that is operated by the controller 201 for securing said doors, such that the controller 201 is capable of locking/unlocking and/or opening/closing the access control device 110-A. The enclosure defined by the display unit 504 defines a secure region within the environment. In some embodiments, the security element 510 and handles 508 are combined within an electronic door handle which receives control signals and may secure the display unit 504 by mechanically limiting or preventing a physical manipulation (e.g., twisting) of the handles 508, mechanically disengaging the handle from a bolt used to secure the doors. In other embodiments, the security element 510 is separate from the handles 508. In one example, the security element 510 may receive control signals to operate a latch bolt, deadbolt, or other element of a lockset physically coupled with the doors 506. In another example, the security element 510 comprises an electromagnetic door lock distributed between framing of the display unit 504 and the doors 506.

While specific features of the exemplary access control device 110-A have been described with reference to a display unit, it is to be understood the access control device 110-A can be any type of enclosed container. Some non-limiting examples include a safe, a beverage cooler, and so forth. Further, while a customer is used to explain the exemplary embodiments above, the invention should not be limited to such. For example, the person could be an employee, vendor, or another predefined class of the persons within environment 100.

Once the customer 502 begins moving towards a specific access control device 110, such as access control device 110-A shown, the controller 201 may reorient or otherwise control the visual sensor 102 to better capture the customer's interaction with the access control device 110. For example, as shown in view 500, the controller 201 may recognize that the customer 502 is stepping towards access control device 110-A in order to gain access to one or more secured items. In one exemplary embodiment, the controller 201 has a predetermined distance that indicates a person is moving towards the access control device. That is, the controller 201 recognizes that the customer 502 is within proximity distance 509, which indicates customer 502 is attempting to interact with the access control device 110-A. While a predetermined distance is used for simplicity, the controller 201 may use any method/logic for determining a person is moving towards the access control device. Some non-limiting examples include determining the movement speed and/or direction of the person towards/away from the access control device, fuzzy logic, a weighted calculation, and so forth.

Before allowing customer 502 to access the items stored within access control device 110-A, the controller 201 may first identify customer 502 to determine whether customer 502 has the requisite security qualification to access the secured items. In one exemplary embodiment, the customer 502 was identified upon entering environment 100 as explained with regards to FIGS. 3A-3B. In another embodiment, customer 502 is identified upon attempting to open an access control device 110. In a further embodiment, the customer 502 is identified upon entering the proximity distance 509. In one exemplary embodiment, the controller 201, after identifying customer 502, may use the information stored in known persons data 240 (FIG. 2) to determine whether the security qualification of customer 502 allows them to open security access control device 110-A (FIG. 5A).

In one exemplary embodiment, the controller 201 uses the visual sensor 102 to capture image information that includes a behavior of customer 502. The controller 201 may compare the behavior of customer 502 to a plurality of predetermined behaviors to categorize the behavior. Once the controller 201 has categorized the behavior of customer 502, the controller 201 may then compare the determined behavior with a predetermined behavior associated with opening the access control device 110-A. Upon determining the behavior of customer 502 is the same as the behavior associated with opening the access control device 110-A, the controller 201 may unlock access control device 110-A for customer 502 to access the secured items.

For example, the controller 201 may determine that customer 502 is attempting to open the access control device 110-A based on the behavior of customer 502. As discussed above, the controller 201 may recognize a predefined visual access behavior to indicate a person would like to access the secure region through access control device 110-A. That is, the access control device 110-A may have a visual access behavior 511 that is a "thumbs up." As shown in FIG. 5A, the customer 502 is providing the visual access behavior 511 (i.e., a "thumbs up") towards the access control device 110-A. Upon recognizing the visual access behavior 511 by customer 502, the controller 201 transmits control signals to deactivate the security element 510 and thereby unlock the access control device 110-A so that customer 502 can access the secured items within the secure region.

While a "thumbs up" has been used as an example of an access behavior, the invention should not be limited to such. Some non-limiting examples of access behaviors include reaching toward a handle, knob or lever of the access control device, performing a predefined gesture mimicking operating a handle, knob or lever of a door while in proximity of the access control device, performing a predefined gesture mimicking opening an enclosure with dual doors while in proximity of the access control device, reaching toward the access control device, waving towards the access control device, performing a predefined hand gesture indicating approval while in proximity of the access control device (e.g., a thumbs up, waving), and mouthing a predefined word while in proximity of the access control device.

In another exemplary embodiment, the controller 201 may determine that the categorized behavior of the person is an emergency behavior indicating the person is in distress and/or needs assistance. In one example, during a robbery occurring within the environment, the customer 502 may represent a supervisor or other employee attempting to access the secure region 112 under threat of force. In such a case, the person may provide a predefined gesture towards the access control device 110-A, which controller 201 identifies as a predefined emergency behavior indicating that the person is in distress or needs assistance. In some embodiments, in response to identifying the predefined emergency behavior, the controller 201 communicates an emergency message to another computing device within, or external to, the environment 100. In one non-limiting example, the emergency message is communicated to a networked computing device associated with a supervisor of the person. In another non-limiting example, the emergency message is communicated over a network with a security service and/or law enforcement. In some cases, the controller 201 may further support the security/law enforcement function by recording interactions with the access control devices 110, operating the visual sensor 102 to focus on the person and/or other persons included within its field of view (e.g., suspects).

In some embodiments, the controller 201 further deactivates the security element 510 responsive to identifying the predefined emergency behavior. In this way, the person successfully accesses items within the access control device 110-A to avoid the appearance of resisting the robbery and/or avoid the appearance of alerting security and/or law enforcement. Communication of the emergency message can be performed with any suitable timing relative to deactivating the security element 510, such as non-overlapping in time (i.e., before or after) or at least partially overlapping in time. In this manner, the controller 201 is capable of taking different actions depending on the determined physical movement of persons within the environment.

Turning to FIG. 5B, view 550 generally illustrates customer 502 accessing items stored within access control device 110-A according to an exemplary embodiment. As shown, controller 201 has deactivated the security element 510 (not illustrated) to allow customer 502 to open the access control device 110-A and access the secured items. The access control device 110-A comprises a display unit 504 having multiple shelves 512 containing a plurality of purchasable items 514. In an alternative embodiment, deactivating the security element 510 automatically opens the access control device 110-A so that the customer 502 does not need to further physically manipulate the access control device 110-A. For example, the display unit 504 may include a mechanical device such as actuators (not shown) that, upon receiving a signal from the controller 201, open the doors 506 for the customer 502. Once the access control device 110-A is open, the controller 201 may use the visual sensors 102 to determine one or more predefined behaviors relative to one or more of the purchasable items 514 included within the secure region. For example, the controller 201 may determine that the customer 502 has picked up an item 516 from within the access control device 110-A. Accordingly, the controller 201 adds item 516 to customer 502's virtual transaction, as well as removing item 516 from the store inventory 402 (FIG. 4A). In this manner, the controller 201 is capable of tracking the movement of secured items from an access control device 110, as well as throughout environment 100.

As shown in FIG. 5C, view 575 illustrates customer 502 completing their interaction with access control device 110-A according to one exemplary embodiment. The controller 201 may use the image information provided by the visual sensors 102 to identify one or more predefined behaviors indicating that the customer 502 has finished interacting with the access control device 110-A. As illustrated, customer 502 has picked up item 516, closed the doors 506 of display unit 504, and has begun walking away from the display unit 504. In one exemplary embodiment, closing the doors 506 to the display unit 504 is a predefined behavior which, when identified by the controller 201, causes the controller 201 to activate the security element 510 to re-secure the items stored within the display unit 504. In another exemplary embodiment, the customer 502 performs a predefined locking gesture causing the controller 201 to activate the security element 510. In another embodiment, the customer 502 walks more than a predefined distance away from the display unit 504 causing the controller 201 to activate the security element 510. For example, as shown, customer 502 has walked outside of the proximity distance 509. Thus, the controller 201 recognizes that the security element 510 should be activated. In some embodiments, the controller 201 activates the security element 510 after elapse of a predetermined time following the identified behavior without a subsequent access behavior by the person.

In some embodiments, the controller 201 may identify that the access control device 110-A is not properly secured. For example, the customer 502 may have walked away from the display unit 504 without closing the doors 506. The controller 201 may perform one or more actions in response, such as communicating a message to a computing device associated with the customer 502 and/or an employee of environment 100. In another exemplary embodiment, the controller 201 sends a signal to a mechanical device (e.g., an actuator) attached to the doors 506 of the display unit 504 that causes the mechanical device to close the doors 506. In this manner, the controller 201 is capable of automatically re-securing the items stored in an access control device once a person is finished interacting with the access control device.

Once customer 502 has finished interacting with the access control device 110-A, customer 502 may continue to walk through environment 100 adding items to their virtual transaction. Once customer 502 has completed their interaction with environment 100, the customer 502 may proceed to the checkout region 108 (FIG. 1) to complete the virtual transaction. In one exemplary embodiment, the controller 201 ensures that customer 502's security qualification 419 (FIG. 4A) is appropriate for all of the items in customer 502's virtual transaction 424 (FIG. 4A) before completing the virtual transaction. In this manner, the controller 201 ensures that items accessed by a person authorized to access a secure region are not subsequently transferred to and purchased by another person not having the proper security qualification.

While the FIGS. 5A-5C illustrate a scenario involving a customer of environment 100, persons of different classes may open the access control device 110-A in a similar manner. For example, an employee may walk up to the access control device 110-A with a plurality of items to be placed within the access control device 110-A. The controller 201, recognizing the employee is attempting to stock the access control device 110-A, may allow the employee to open the access control device 110-A. The controller 201 may then update the store inventory 402 (FIG. 4A) based upon what items the employee adds to the access control device 110-A. Once the employee is finished interacting with the access control device 110-A, the controller 201 secures the access control device 110-A. In this manner, an employee of environment 100 is capable of accessing and stocking an access control device in a real time without the need to unlock the access control device with a key.

Figure 6A:
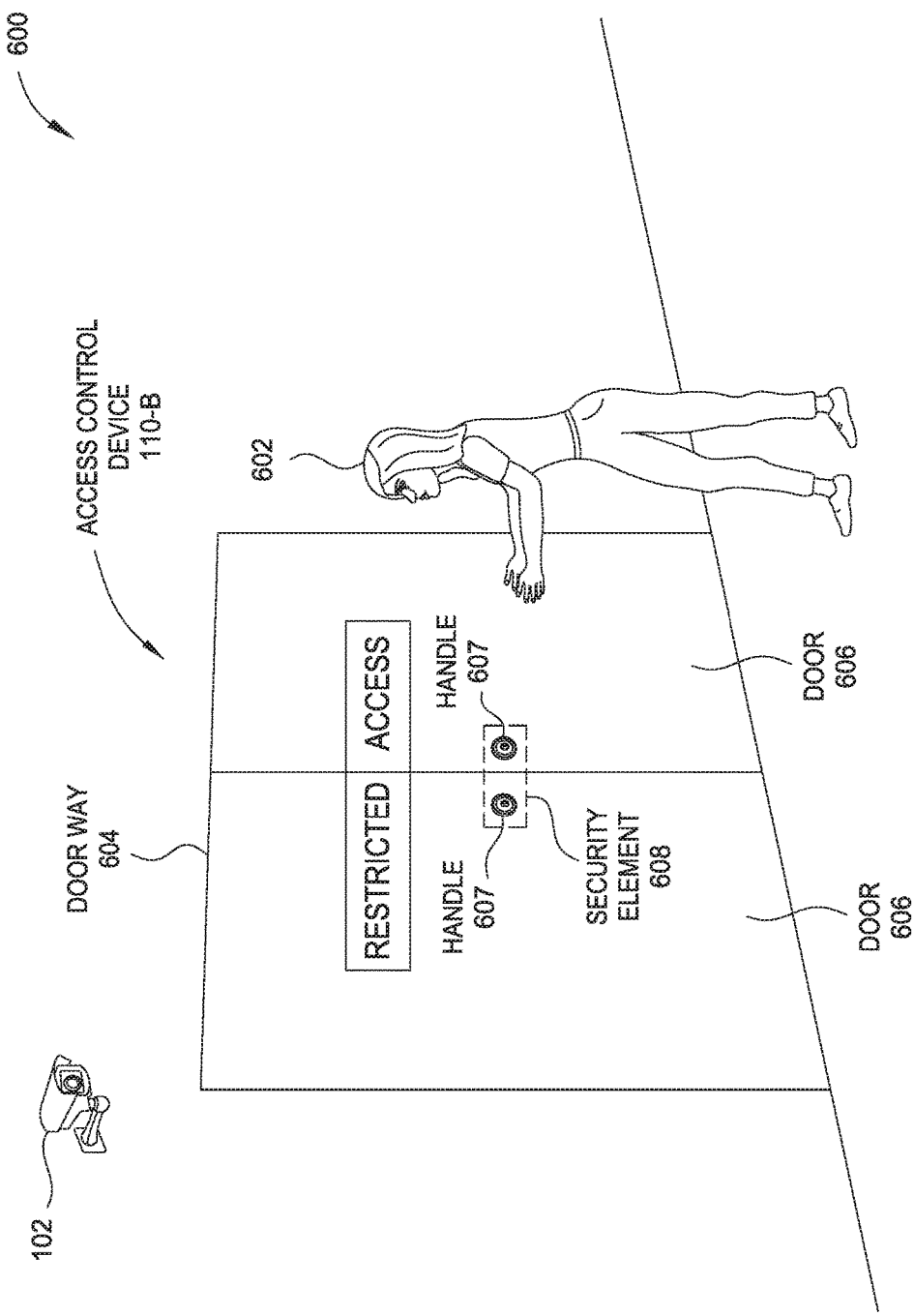

Turning to FIGS. 6A-6D, a person accessing a secure region via an access control device is illustrated according to an exemplary embodiment. In FIG. 6A, view 600 generally shows a customer 602 attempting to access a secure region (not shown) via access control device 110-B, which is a doorway 604 that controls access to the secure region 112. In this case, the doorway 604 partially defines the secure region 112 and includes doors 606, handles 607, and a security element 608 for securing said doors 606. That is, the controller 201 is capable of transmitting control signals to the security element 608 for locking/unlocking and/or opening/closing the access control device 110-B.

Once the customer 602 begins moving towards access control device 110-B, the controller 201 may reorient or otherwise control the visual sensor 102 to better capture the customer's interaction with the access control device 110-B. For example, as shown in view 600, the controller 201 may recognize that the customer 602 is stepping towards access control device 110-B in order to gain entry to the secure region. Before allowing customer 602 to access to the secure region via access control device 110-B, the controller 201 may first identify customer 602 to determine whether customer 602 has the requisite security qualification 419 (FIG. 4A) to access the secured items.

After determining that customer 602 has the requisite security qualification to access the secured items, the controller 201 may determine customer 602 is attempting to open the access control device 110-B. The controller 201 may use the visual sensor 102 to capture image information that includes a physical movement by customer 602. The controller 201 may have a predetermined movement which determines whether access control device 110-B should be opened such as reaching for a handle on access control device 110-B, mimicking opening a door, or any other movement that environment 100 determines should allow a person access to the secured items. Upon recognizing the predetermined movement by customer 602, the controller 201 unlocks the access control device 110-B so that customer 502 can enter the secure region. In another exemplary embodiment, in addition to unlocking the doors, the controller 201 automatically opens the doors so that the customer 502 does not have to physically open the doors.

Turning to FIG. 6B, view 625 generally illustrates customer 602 interacting with a display unit 106 within the secure region 112 according to one exemplary embodiment. As shown, customer 602 has entered into the secure region 112 via the access control device 110-B. Upon customer 602 closing the access control device 110-B, the controller 201 locks the access control device 110-B in order to maintain the security of the secure region 112. In another exemplary embodiment, customer 602 may not have closed the access control device 110-B before walking away. The controller 201 may recognize that the security of the secure region 112 is compromised, and take the actions necessary to close and lock the access control device 110-B. That is, the controller 201 may send a signal to a mechanical device (e.g., an actuator) attached to the doors 606 which causes the doors 606 to be closed. In this manner, the controller 201 is capable of automatically maintaining the security of secure region 112 once a person is finished interacting with the access control device 110-B.

Once the customer 602 is within the secure region 112, the controller 201 may use the visual sensors 102 to determine that the customer 602 is interacting with the display unit 106. Accordingly, the controller 201 may add items to customer 602's virtual transaction 424 (FIG. 4A), as well as removing items from the store inventory 402 (FIG. 4A). In this manner, the controller 201 is capable of tracking the movement of secured items from a secure region 112 and throughout environment 100.

Figure 6C:
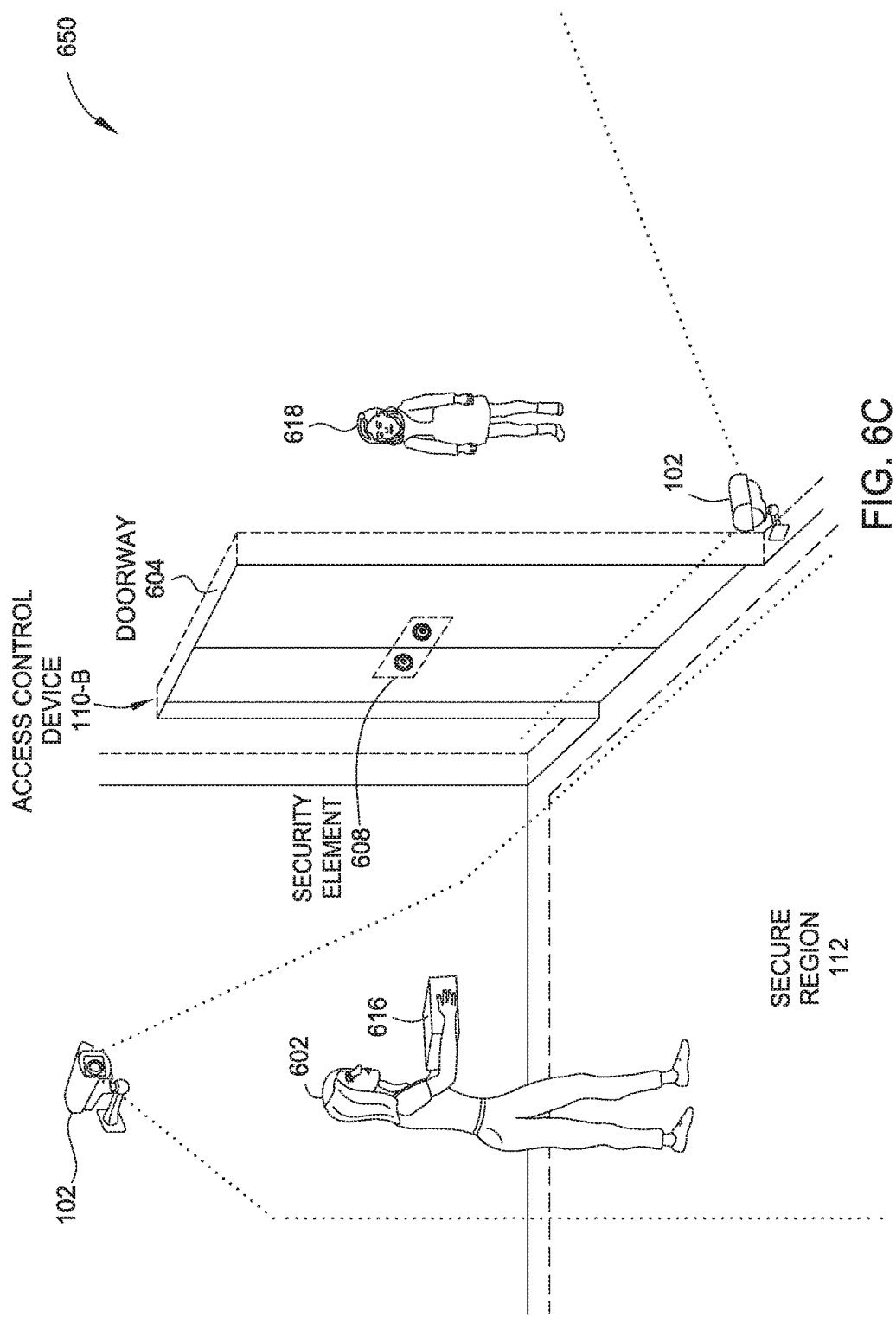

Turning to FIG. 6C, view 650 generally illustrates that customer 602 has finished interacting with the display unit, and is attempting to exit the secure region 112. As shown, customer 602 is in secure region 112 moving towards access control device 110-B and possesses secured item 610. On the other side of access control device 110-B (i.e., not in the secure region 112), a customer 618 is present. The controller 201 may use image information captured from the visual sensors 102 to determine the movement/location of customers 602 and 618. In one exemplary embodiment, the controller 201 determines that customer 618 does not have the requisite security qualification to enter the secure region 112. For example, the secure region 112 may be an age restricted region that only persons over a certain age are able to enter. Customer 618 may not meet the minimum age requirement, and thus should not be allowed to access the secure region 112. Therefore, the controller 201 may take necessary actions to ensure that customer 606 does not gain access to secure region 112.

In one exemplary embodiment, the controller 201 prevents customer 602 from opening access control device 110-B in order to ensure that customer 618 does not gain access to the secure region 112. The controller 201 may inform customer 602 as to why they are unable to leave the secure region 112. That is, the controller may communicate with customer 602 via a display, a personal device associated with the customer, a speaker, or any other communication device. Similarly, the controller 201 may communicate with customer 618 to request that customer 618 relocate away from the access control device 110-B. Further, the controller 201 may inform an employee of environment 100 of the situation so that the employee can take the appropriate action(s) to ensure customer 618 does not gain access to the secure region 112.

In an alternative embodiment, instead of preventing customer 602 from leaving the secure region 112, the controller 201 may allow customer 602 to leave the secure region while monitoring customer 618 to ensure customer 618 does not attempt to access the secure region 112 while the access control device 110-B is open. That is, the controller 201 may monitor customer 618 to ensure that customer 618 does not sneak into the secure region 112 when the access control device 110-B is open. If customer 618 does manage to sneak into the secure region 112, the controller 201 may take appropriate actions such as notifying an employee of environment 100 of the security breach.

While the foregoing has been described with an access control device 110-B as shown in FIG. 6C, the controller 201 may take similar actions to prevent any unauthorized persons from accessing any type of access control device 110. In this manner, the controller 201 is capable of recognizing when a person without the necessary security qualifications is attempting to gain, or has gained, access to a secured area and take the appropriate actions to prevent and/or correct the unauthorized access.

In another exemplary embodiment, the controller 201 is capable of determining a person is in possession of a secured item that they should not possess, and takes action(s) to remove the item from the person's possession. For example, customer 602 may provide customer 618 with the previously secured item 610. However, as previously mentioned, customer 618 does not have the required security qualification to handle the secured item 610 because they are too young. Thus, the controller 201 determines based upon the required security level of the secured item 610 and customer 618's security qualification that customer 618 should not possess the secured item 610. The controller 201 may notify an employee of environment 100 that customer 618 is in possession of the secured item 610 so that the employee can take appropriate action. Further, since the controller 201 provides a substantially continuous tracking of the location of the secured item 610 and who is in possession of secured item 610, the controller 201 can identify that customer 602 provided the secured item 610 to customer 618. Thus, the controller 201 may prevent customer 602 from accessing the secure region 112 in the future because of the security breach. For example, the controller 201 may update the known persons data associated with customer 602 to reduce their security qualification. In this manner, the controller 201 is capable of automatically enforcing the security of items throughout the environment, as well as adjusting the security qualification of persons as needed.

Figure 6D:
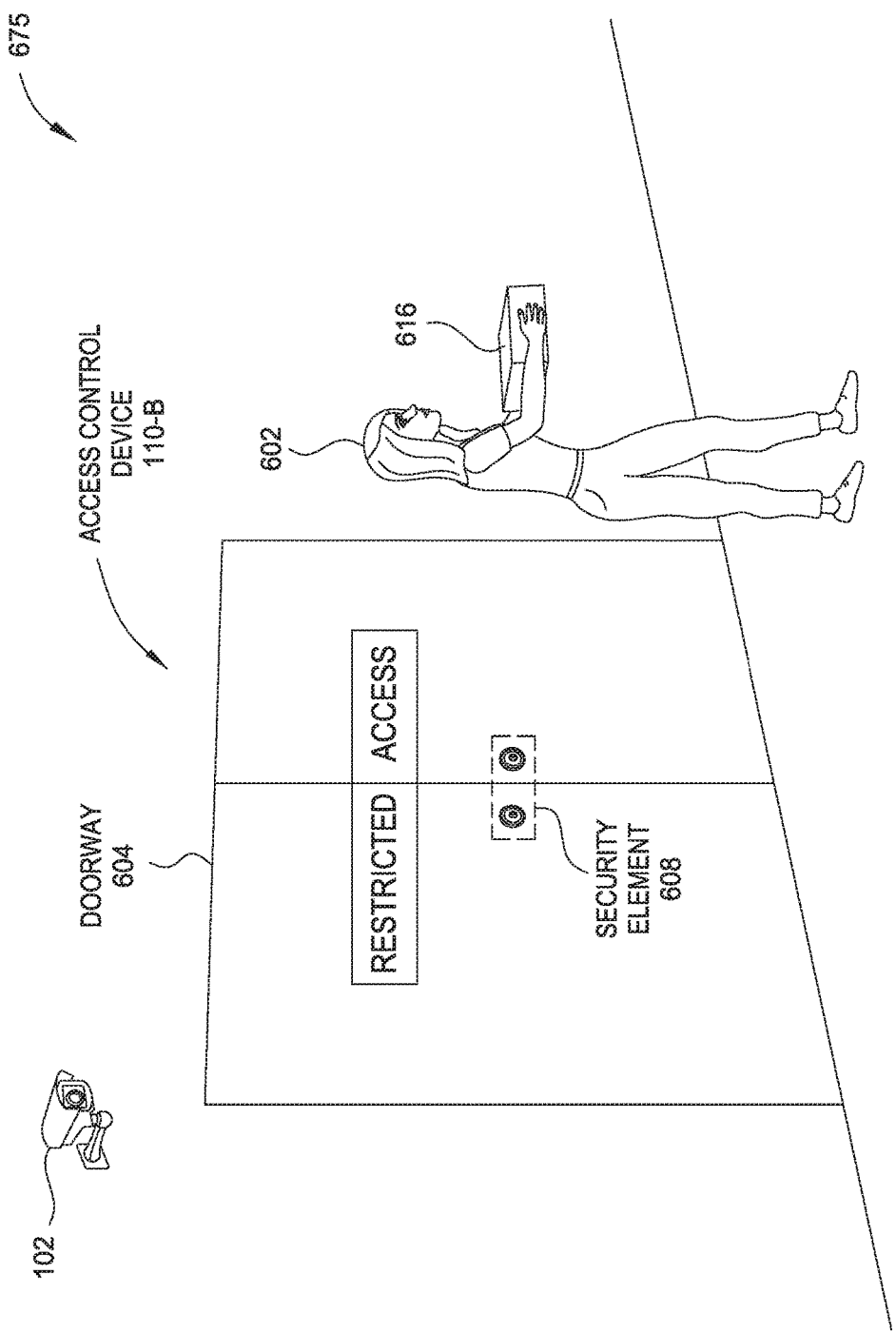

Turning to FIG. 6D, view 675 generally illustrates customer 602 leaving the secure region with secured item 610 according to an exemplary embodiment. Once customer 606 (not shown) has left the immediate area around the access control device 110-B, the controller 201 may allow customer 602 to leave the secure region. Further, once customer 602 has finished interacting with the access control device 110-B, controller 201 may ensure that access control device 110-B is properly closed and secured such that no unauthorized persons can gain access to the secure region. In this manner, the controller 201 may ensure the security of secure areas.

Figure 7:
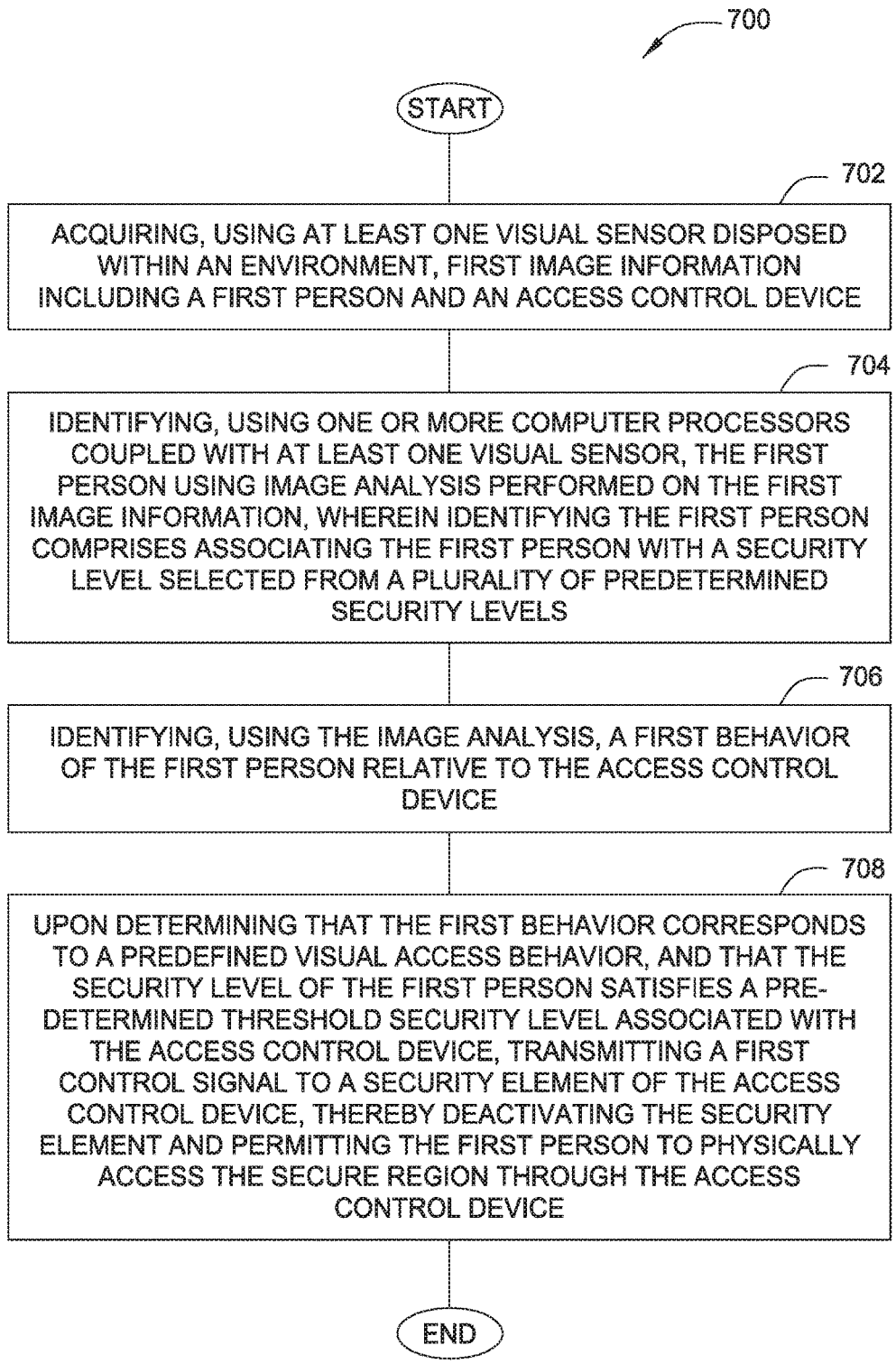
FIG. 7 illustrates a method of accessing a secure region within an environment, according to one embodiment.

FIG. 7 illustrates a method of allowing a person to access a secure region within an environment, according to one embodiment. The method 700 may be used in coordination with the systems and environments described herein.

Method 700 begins at block 702, where at least one visual sensor disposed within the environment acquires first image information including a first person and an access control device. In one embodiment, the first image information is acquired at the time the person enters the environment. In another embodiment, the first image information is acquired when the person interacts with the access control device. For example, at least one visual sensor may be oriented to acquire first image information upon the person approaching the access control device within the environment.

At block 704, the first person is identified using image analysis performed on the first image information, wherein identifying the first person comprises associating the first person with a security level selected from a plurality of predetermined security levels. The identification may include an analysis of the image information to determine physical attributes of the at least one person. In another embodiment, the system may compare the physical attributes of the at least one person to persons previously known to the environment to identify the person and select the predetermined security level.

At block 706, a first behavior of the first person relative to the access control device is identified using the image analysis. In one embodiment, the first behavior is one of a plurality of predetermine behaviors. In another embodiment, the first behavior is a behavior defined as an emergency behavior to signal the first person is in need of assistance.

At block 708, upon determining that the first behavior corresponds to a predefined visual access behavior, and that the security level of the first person satisfies a predetermined threshold security level associated with the access control device, transmitting a first control signal to a security element of the access control device. Transmitting the control signal to the security element deactivates the security element and permits the first person to physically access the secure region through the access control device. In one embodiment, the predetermined visual access behavior is reaching for a handle located on the access control device. Method 700 is completed following block 708.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of the present disclosure, a user may access applications (e.g., a retail store app for a mobile computing device) or related data (e.g., compiled shopping data) available in the cloud. Doing so allows a user to access this information from any computing system attached to a network connected to the cloud (e.g., the Internet).

While the foregoing is directed to embodiments of the present disclosure, other and further embodiments of the disclosure may be devised without departing from the basic scope thereof, and the scope thereof is determined by the claims that follow.

What is claimed is:

1. A computer-implemented method of facilitating access by a first person to a secure region within an environment having a plurality of items, wherein the secure region is at least partly defined by an access control device, the method comprising:
   acquiring, using at least one visual sensor disposed within the environment, first image information including the first person and the access control device;
   using one or more computer processors coupled with the at least one visual sensor, performing image analysis on the first image information to:
      identify the first person; and
      identify a first behavior of the first person relative to the access control device;
   upon determining (1) that the first behavior corresponds to a predefined visual access behavior indicating that the first person is in the process of manually operating the access control device, and (2) that a security level associated with the first person satisfies a predetermined threshold security level associated with the access control device, transmitting a first control signal to a security element of the access control device to thereby permit the first person to physically access the secure region;
   acquiring, using the at least one visual sensor, second image information including the first person and the access control device;
   identifying, using image analysis performed on the second image information, a second behavior of the first person relative to the access control device; and
   upon determining, based on the second behavior, that the first person is no longer physically accessing the secure region, transmitting a second control signal to the security element, thereby activating the security element to prevent subsequent unauthorized attempts to physically access the secure region.

2. The computer-implemented method of claim 1, wherein the predefined visual access behavior is selected from a group comprising one or more of:
   (1) moving toward the access control device,
   (2) reaching toward a handle, knob, or lever of the access control device,
   (3) performing a predefined gesture mimicking operating a handle, knob, or lever of a door while in proximity of the access control device,
   (4) performing a predefined gesture mimicking opening an enclosure with dual doors while in proximity of the access control device,
   (5) reaching toward the access control device, and
   (6) waving towards the access control device.

3. The computer-implemented method of claim 1, wherein identifying the first person further comprises:
   accessing known persons data stored in a computer-readable memory coupled with the one or more computer processors, wherein the known persons data identifies a plurality of known persons having a predefined association with the environment; and
   determining, based on the known persons data, that the plurality of known persons includes the first person,
   wherein associating the first person with a security level comprises determining the security level based on the known persons data.

4. The computer-implemented method of claim 1, wherein identifying the first person further comprises:
   accessing known persons data stored in a computer-readable memory coupled with the one or more computer processors, wherein the known persons data identifies a plurality of known persons having a predefined association with the environment; and
   determining, based on the known persons data, that the plurality of known persons does not include the first person,
   wherein associating the first person with a security level comprises determining the security level based on one or more characteristics of the first person visually determined using the image analysis.

5. The computer-implemented method of claim 1, wherein identifying the first person further comprises determining a class of the first person, the class selected from one of a predefined customer class, a predefined employee class, and a predefined vendor class,
   wherein the security level is based at least in part on the determined class of the first person.

6. The computer-implemented method of claim 1, further comprising:
   upon determining that the predefined visual access behavior corresponds to a predefined emergency behavior indicating the first person is in distress, communicating an emergency message.

7. A system for facilitating access by a first person to a secure region within an environment having a plurality of items, wherein the secure region is at least partly defined by an access control device, the system comprising:
   a plurality of visual sensors located throughout the environment; and
   a controller configured to:
      acquire, using at least one of the plurality of visual sensors, first image information including the first person and the access control device;
      perform image analysis on the first image information to:
         identify the first person; and
         identify a first behavior of the first person relative to the access control device;
      upon determining (1) that the first behavior corresponds to a predefined visual access behavior indicating that the first person is in the process of manually operating the access control device, and (2) that a security level associated with the first person satisfies a predetermined threshold security level associated with the access control device, transmit a first control signal to a security element of the access control device to thereby permit the first person to physically access the secure region;
      acquire, using at least one of the plurality of visual sensors, second image information including the first person and the access control device;
      identify, using image analysis performed on the second image information, a second behavior of the first person relative to the access control device; and
      upon determining, based on the second behavior, that the first person is no longer physically accessing the secure region, transmit a second control signal to the security element, thereby activating the security element to prevent subsequent unauthorized attempts to physically access the secure region.

8. The system of claim 7, wherein the predefined visual access behavior is selected from a group comprising one or more of:
(1) moving toward the access control device,
(2) reaching toward a handle, knob, or lever of the access control device,
(3) performing a predefined gesture mimicking operating a handle, knob, or lever of a door while in proximity of the access control device,
(4) performing a predefined gesture mimicking opening an enclosure with dual doors while in proximity of the access control device,
(5) reaching toward the access control device, and
(6) waving towards the access control device.

9. The system of claim 7, wherein identifying the first person further comprises:
accessing known persons data stored in a computer-readable memory of the controller, wherein the known persons data identifies a plurality of known persons having a predefined association with the environment; and
determining, based on the known persons data, that the plurality of known persons includes the first person,
wherein associating the first person with a security level comprises determining the security level based on the known persons data.

10. The system of claim 7, wherein identifying the first person further comprises:
accessing known persons data stored in a computer-readable memory coupled with the controller, wherein the known persons data identifies a plurality of known persons having a predefined association with the environment; and
determining, based on the known persons data, that the plurality of known persons does not include the first person,
wherein associating the first person with a security level comprises determining the security level based on one or more characteristics of the first person visually determined using the image analysis.

11. The system of claim 7, wherein identifying the first person further comprises determining a class of the first person, the class selected from one of a predefined customer class, a predefined employee class, and a predefined vendor class,
wherein the security level is based at least in part on the determined class of the first person.

12. The system of claim 7, wherein the controller further is configured to:
upon determining that the predefined visual access behavior corresponds to a predefined emergency behavior indicating the first person is in distress, communicate an emergency message.

13. A computer program product to facilitate access by a first person to a secure region within an environment having a plurality of items, wherein the secure region is at least partly defined by an access control device, the computer program product comprising:
a non-transitory computer-readable storage medium having computer-readable program code embodied therewith, the computer-readable program code executable by one or more computer processors to perform an operation that includes:
acquiring, using at least one visual sensor coupled with the one or more processors and disposed within the environment, first image information including the first person and the access control device;
performing image analysis on the first image information to:
identify the first person; and
identify a first behavior of the first person relative to the access control device;
upon determining (1) that the first behavior corresponds to a predefined visual access behavior indicating that the first person is in the process of manually operating the access control device, and (2) that a security level associated with the first person satisfies a predetermined threshold security level associated with the access control device, transmitting a first control signal to a security element of the access control device to thereby permit the first person to physically access the secure region;
acquiring, using at least one visual sensor disposed within the environment, second image information including the first person and the access control device;
identifying, using image analysis performed on the second image information, a second behavior of the first person relative to the access control device; and
upon determining, based on the second behavior, that the first person is no longer physically accessing the secure region, transmitting a second control signal to the security element, thereby activating the security element to prevent subsequent unauthorized attempts to physically access the secure region.

14. The computer program product of claim 13, wherein the predefined visual access behavior is selected from a group comprising one or more of:
(1) moving toward the access control device,
(2) reaching toward a handle, knob, or lever of the access control device,
(3) performing a predefined gesture mimicking operating a handle, knob, or lever of a door while in proximity of the access control device,
(4) performing a predefined gesture mimicking opening an enclosure with dual doors while in proximity of the access control device,
(5) reaching toward the access control device, and
(6) waving towards the access control device.

15. The computer program product of claim 13, wherein identifying the first person further comprises:
accessing known persons data stored in a computer-readable memory coupled with the one or more computer processors, wherein the known persons data identifies a plurality of known persons having a predefined association with the environment; and
determining, based on the known persons data, that the plurality of known persons includes the first person,
wherein associating the first person with a security level comprises determining the security level based on the known persons data.

16. The computer program product of claim 13, wherein identifying the first person further comprises:
accessing known persons data stored in a computer-readable memory coupled with the one or more computer processors, wherein the known persons data identifies a plurality of known persons having a predefined association with the environment; and
determining, based on the known persons data, that the plurality of known persons does not include the first person, wherein associating the first person with a security level comprises determining the security level based on one or more characteristics of the first person visually determined using the image analysis.

17. The computer program product of claim 13, wherein identifying the first person further comprises determining a class of the first person, the class selected from one of a predefined customer class, a predefined employee class, and a predefined vendor class,
wherein the security level is based at least in part on the determined class of the first person.

* * * * *